United States Patent
Kim et al.

(10) Patent No.: US 10,554,378 B2
(45) Date of Patent: Feb. 4, 2020

(54) METHOD AND APPARATUS FOR MULTI-USER RECEPTION IN WIRELESS COMMUNICATION SYSTEM

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Chanhong Kim, Suwon-si (KR); Daesik Hong, Seoul (KR); Sung Woo Weon, Namdong-gu (KR); Insik Jung, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 144 days.

(21) Appl. No.: 15/374,838

(22) Filed: Dec. 9, 2016

(65) Prior Publication Data

US 2017/0170950 A1    Jun. 15, 2017

(30) Foreign Application Priority Data

Dec. 11, 2015    (KR) .................. 10-2015-0177392

(51) Int. Cl.
*H04L 7/00* (2006.01)
*H04L 27/26* (2006.01)
(Continued)

(52) U.S. Cl.
CPC ........ *H04L 7/0016* (2013.01); *H04L 27/2627* (2013.01); *H04L 27/2665* (2013.01); *H04W 72/0453* (2013.01); *H04W 72/082* (2013.01)

(58) Field of Classification Search
CPC .............. H04L 7/0016; H04L 27/2665; H04L 27/2627; H04W 72/0453; H04W 72/082
See application file for complete search history.

(56) References Cited

U.S. PATENT DOCUMENTS 7,733,969 B2 * 6/2010 Zhang ................ H04L 27/2613
                                                              375/260
9,596,105 B1 * 3/2017 Smekhov ............ H04L 27/2665
(Continued)

FOREIGN PATENT DOCUMENTS

KR    20090033005 A    4/2009
KR    20120136867 A    12/2012
(Continued)

OTHER PUBLICATIONS

Ove Edfors, et al., "OFDM channel estimation by singular value decomposition," In IEEE Transactions on Communications, vol. 46 No. 7, Jul. 1998, pp. 931-939, publisher IEEE, Piscataway, NJ.
(Continued)

*Primary Examiner* — Redentor Pasia

(57) ABSTRACT

The present disclosure relates to a pre-5th-Generation (5G) or 5G communication system to be provided for supporting higher data rates Beyond 4th-Generation (4G) communication system such as Long Term Evolution (LTE). An operation method for a receiving end in a wireless communication system includes receiving signals from a plurality of transmitting ends; determining filters for each of the plurality of transmitting ends; and filtering the signals using each of the filters.

14 Claims, 26 Drawing Sheets

(51) Int. Cl.
*H04W 72/04* (2009.01)
*H04W 72/08* (2009.01)

(56) References Cited

U.S. PATENT DOCUMENTS

| | | | | |
|---|---|---|---|---|
| 9,735,940 | B1* | 8/2017 | Bakr | H04L 5/0053 |
| 9,967,007 | B2* | 5/2018 | Shattil | H04B 7/024 |
| 2006/0269007 | A1* | 11/2006 | Zhang | H04L 27/2613 |
| | | | | 375/260 |
| 2008/0240295 | A1* | 10/2008 | Kim | H04L 27/066 |
| | | | | 375/321 |
| 2010/0019564 | A1 | 1/2010 | Theuer | |
| 2010/0195640 | A1 | 8/2010 | Park et al. | |
| 2012/0269234 | A1* | 10/2012 | Zhang | H04L 5/0007 |
| | | | | 375/143 |
| 2013/0250911 | A1 | 9/2013 | Kwon et al. | |
| 2014/0086213 | A1 | 3/2014 | Kwon et al. | |
| 2014/0153675 | A1* | 6/2014 | Dandach | H04L 27/2684 |
| | | | | 375/340 |
| 2014/0286384 | A1* | 9/2014 | Mestre Pons | H04L 27/01 |
| | | | | 375/232 |
| 2014/0321524 | A1* | 10/2014 | Kim | H04L 27/2647 |
| | | | | 375/232 |
| 2016/0007306 | A1* | 1/2016 | Hong | H04W 56/001 |
| | | | | 370/503 |
| 2016/0013961 | A1* | 1/2016 | Dore | H04L 27/264 |
| | | | | 375/316 |

FOREIGN PATENT DOCUMENTS

| | | | |
|---|---|---|---|
| KR | 20130055469 | A | 5/2013 |
| KR | 20130107984 | A | 10/2013 |
| KR | 20150051093 | A | 5/2015 |

OTHER PUBLICATIONS

Tobias Hidalgo Stitz, et al., "Pilot-Based synchronization and equalization in filter bank multicarrier communications," EURASIP Journal on Advances in Signal Processing vol. 2010, Article ID 741429, 2010, 18 pages, publisher Hindawi Publishing Corporation, Nasr City, Cairo Governorate, Egypt.

Yao Cheng, et al., "FBMC-OQAM for the Asynchronous Multi-User MIMO Uplink," WSA 2014, Mar. 12-13, 2014, Erlangen, Germany, 6 pages, publisher VDE Verlag GMBH, Berlin, Offenbach, Germany.

Angelo Petrella, "Synchronization Algorithms for FBMC Systems," 2008/2009, 201 pages, publisher Universitá Degli Studi Di Napoli Federico II, Napoli, Italy.

Jean-Baptiste Dore, et al., "Performance of FBMC Multiple Access for Relaxed Synchronization Cellular Networks," Globecom 2014 Workshop—Broadband Wireless Access, 2014, pp. 983-988, publisher IEEE, Piscataway, NJ.

Tilde Fusco, et al., "Data-Aided Symbol Timing and CFO Synchronization for Filter Bank Multicarrier Systems," IEEE Transactions on Wireless Communications, vol. 8, No. 5, May 2009, pp. 2705-2715, publisher IEEE, Piscataway, NJ.

Timothy M. Schmidl, et al., "Robust Frequency and Timing Synchronization for OFDM," IEEE Transactions on Communications, vol. 45, No. 12, Dec. 1997, pp. 1613-1621, publisher IEEE, Piscataway, NJ.

H. Minn, et al., "On Timing Offset Estimation for OFDM Systems," IEEE Communcations Letters, vol. 4, No. 7, Jul. 2000, pp. 242-244, publisher IEEE, Piscataway, NJ.

* cited by examiner

METHOD AND APPARATUS FOR MULTI-USER RECEPTION IN WIRELESS COMMUNICATION SYSTEM

CROSS-REFERENCE TO RELATED APPLICATIONS AND CLAIM OF PRIORITY

The present application is related to and claims the priority under 35 U.S.C. § 119(a) to Korean Application Serial No. 10-2015-0177392, which was filed in the Korean Intellectual Property Office on Dec. 11, 2015, the entire content of which is hereby incorporated by reference.

TECHNICAL FIELD

The present disclosure relates to a method and apparatus for multi-user reception in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A Filter Bank Multi Carrier (FBMC) system transmits a signal such that the signal is robust to a time delay and has a small magnitude of a side lobe while changing the shape of a waveform through multiplying filters. In the FBMC technique, the lengths of symbols are increased through the filtering process, and the symbols are overlapped and summed up, and then the same is finally transmitted. In this case, there is an advantage in that a Guard Interval (GI) may not be used due to the benefit in time and the magnitude of the side lobe.

In the uplink wireless communication environment, signals generated by transmitting ends arrive at a receiving end at different propagation times according to positions thereof. In order to reduce the arrival time error between symbols, a method is designed to adjust the signal transmission time point, by the transmitting ends, in consideration of a propagation time by using a certain amount of feedback overhead.

However, since multiple transmitting ends simultaneously cause small traffic in an environment such as Cellular IoT (CIoT), there is a possibility that an overhead generation method described in the above technique may be used in a specific environment at a very high cost. Since the FBMC system does not have a separate Guard Interval (GI), the performance degradation due to the time synchronization error caused by the propagation time for each transmitting end may occur.

SUMMARY

To address the above-discussed deficiencies, it is a primary object to provide a method and apparatus for multi-user reception in a wireless communication system.

An embodiment of the present disclosure provide a method and apparatus for performing filtering on each transmitting end, by a reception end, in consideration of time synchronization errors of signals transmitted by a plurality of transmitting ends in a wireless communication system.

An embodiment of the present disclosure provides a method and apparatus for performing a single structure FFT by separating a reception filter and a Fast Fourier Transform (FFT) block in a receiving end of a wireless communication system.

An embodiment of the present disclosure provides a method and apparatus for reallocating frequency resources of each transmitting end, by a receiving end, in consideration of the time synchronization error of signals transmitted by a plurality of transmitting ends in a wireless communication system.

According to an embodiment of the present disclosure, an operation method for a receiving end in a wireless communication system comprises receiving signals from a plurality of transmitting ends, determining filters for each of the plurality of transmitting ends, and filtering the signals using each of the filters.

According to another embodiment of the present disclosure, an apparatus for a receiving end in a wireless communication system comprises a communication unit configured to receive signals from a plurality of transmitting ends, and a controller configured to determine filters for each of the plurality of transmitting ends, and filter the signals using each of the filters.

According to an embodiment of the present disclosure, a receiving end in a wireless communication system may perform filtering on each transmitting end, for a signal transmitted from each transmitting end, and perform a single FFT on the same, so as to improve the reception performance and reduce the complexity. In addition, according to an embodiment of the present disclosure, the performance of the receiving end can be improved by allocating resources so as to minimize or reduce interference between transmitting ends in the wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, the present disclosure will describe a technology for multi-user reception in a wireless communication system.

Terms used in the following description, such as a term referring to control information, a term referring to a window start point, a term referring to a state change, a term referring to network entities, a term referring to a component of a device, a term referring to a filter, and the like are illustrated for convenience of explanation. Therefore, the present disclosure is not limited to the following terms, and other terms having equivalent technical meanings may be used.

Figure 1:
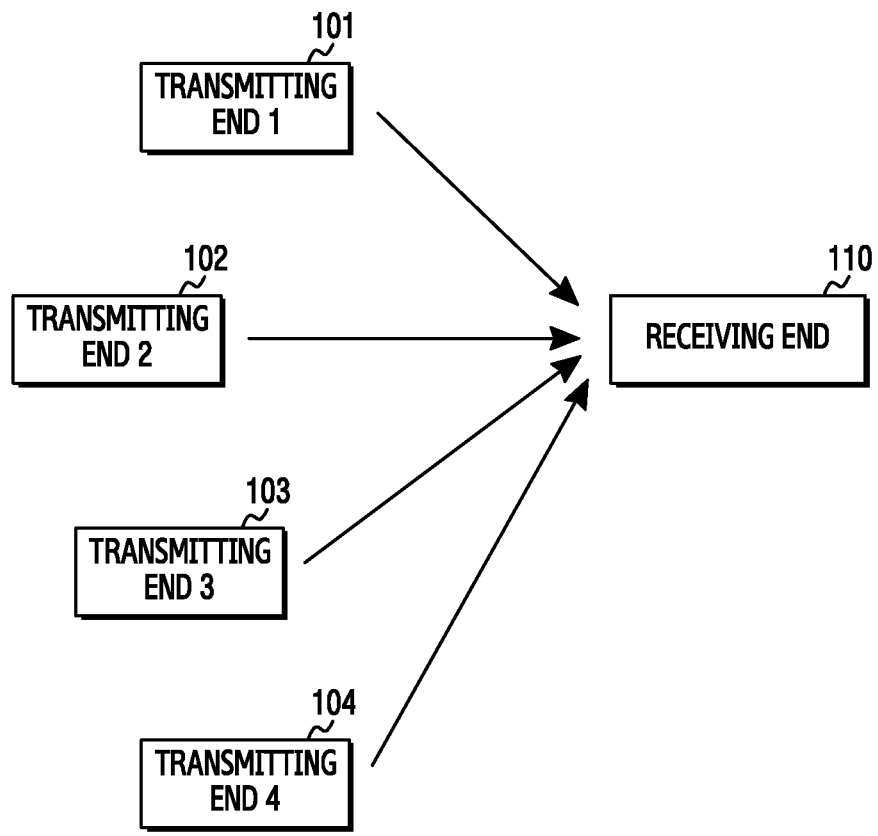
FIG. 1 illustrates a receiving end and transmitting ends in a wireless communication system according to an embodiment of the present disclosure.

FIG. 1 illustrates a receiving end and transmitting ends in a wireless communication system according to an embodiment of the present disclosure.

The receiving end 110 receives signals transmitted by transmitting ends 101 to 104. The transmitting end and the receiving end can be a terminal and a base station, respectively. In addition, the transmitting end and the receiving end can be a base station and a terminal, respectively, such as a Coordinated Multi Point (CoMP) in which a plurality of base stations provide services to one terminal. The transmitting ends 101 to 104 can be devices for communicating with the receiving end 110, and can be destination ends which are a start point or an end point for data transmission. The transmitting ends 101 to 104 can communicate with the receiving end through a wireless channel. Although FIG. 1 illustrates only one receiving end and four transmitting ends for the sake of convenience, a larger number of receiving ends and transmitting ends can be included.

In FIG. 1, the transmitting ends 101 to 104 are provided as an example of an electronic device and do not limit the type thereof. An electronic device according to various embodiments of the present disclosure can include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device.

Hereinafter, an electronic device according to various embodiments will be described with reference to the accompanying drawings. As used herein, the term "user" can indicate a person who uses an electronic device or a device (e.g., an artificial intelligence electronic device) that uses an electronic device.

Figure 2:
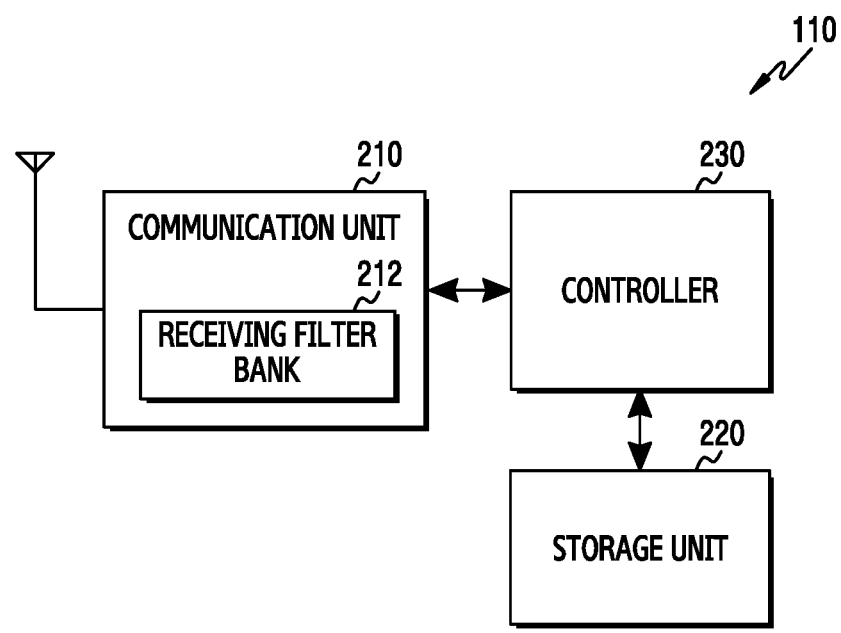
FIG. 2 illustrates a block diagram of a receiving end device in a wireless communication system according to an embodiment of the present disclosure.

FIG. 2 illustrates a block diagram of a receiving end device in a wireless communication system according to an embodiment of the present disclosure. Hereinafter, the terms such as " . . . unit", " . . . device", and the like can refer to a unit that processes at least one function and operation, which is implemented in hardware or software or can be implemented as a combination of hardware and software.

Referring to FIG. 2, the receiving end 110 includes a communication unit 210, a storage unit 220, and a controller 230.

The communication unit 210 performs functions for transmitting and receiving signals through a wireless channel. For example, the communication unit 210 performs a function of conversion between a baseband signal and a bit stream according to a physical layer standard of the system. For example, when data is transmitted, the communication unit 210 generates complex symbols by encoding and modulating a transmission bit stream. In addition, when data is received, the communication unit 210 reconstructs/recover a reception bit stream by demodulating and decoding a baseband signal. In addition, the communication unit 210 up-converts the baseband signal to a radio frequency (RF) band signal, then transmits the converted signal through the antenna, and down-converts the RF band signal received through the antenna to a baseband signal. In particular, the communication unit 210 includes a reception filter bank 212 for analyzing FBMC symbols. Further, the communication unit 210 can include a transmission filter, a reception filter, an amplifier, a mixer, an oscillator, a DAC, an ADC, and the like.

In addition, the communication unit 210 can include a plurality of Radio Frequency (RF) chains. Further, the communication unit 210 can perform beamforming. For beamforming, the communication unit 210 can adjust the phase and size of each of signals transmitted and received through a plurality of antennas or antenna elements. Further, the communication unit 210 can include a plurality of communication modules in order to support a plurality of different wireless connection technologies. The communication unit 210 transmits and receives signals as described above. Accordingly, the communication unit 210 can be referred to as a transmitting unit, a receiving unit, or a transceiver unit.

The storage unit 220 stores data such as a basic program, an application program, and setting information for the operation of the receiving end 110. In particular, the storage unit 220 can store data for signaling with the transmitting end, that is, data for analyzing the message from the transmitting end. In addition, the storage unit 220 provides the stored data according to a request from the controller 230.

The controller 230 controls the overall operations of the receiving end 110. For example, the controller 230 transmits/receives a signal through the communication unit 210. In addition, the controller 230 records and reads data in and from the storage unit 220. To this end, the controller 230 can include at least one processor. For example, the controller 230 can include a CP for controlling the communication, and an AP for controlling an upper layer, such as an application program. According to an embodiment of the present disclosure, the controller 230 can selectively receive moved FBMC symbols and analyze the FBMC symbols based on the movement pattern for the FBMC symbols. For example, the controller 230 can control the receiving end 110 so as to perform FBMC symbol transmission procedures to be described later.

According to various embodiment of the present disclosure, the controller 230 can also be referred as a processor. That is, the processor can also performs operations the controller 230 performs as stated above. The processor can be any type of physical computational circuit or hardware, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, an integrated circuit, an application specific integrated circuit, or any other type of similar and/or suitable processing circuit. The processor can also include embedded controllers, such as generic or programmable logic devices or arrays, application specific integrated circuits, single-chip computers, smart cards, and the like.

Figure 3:
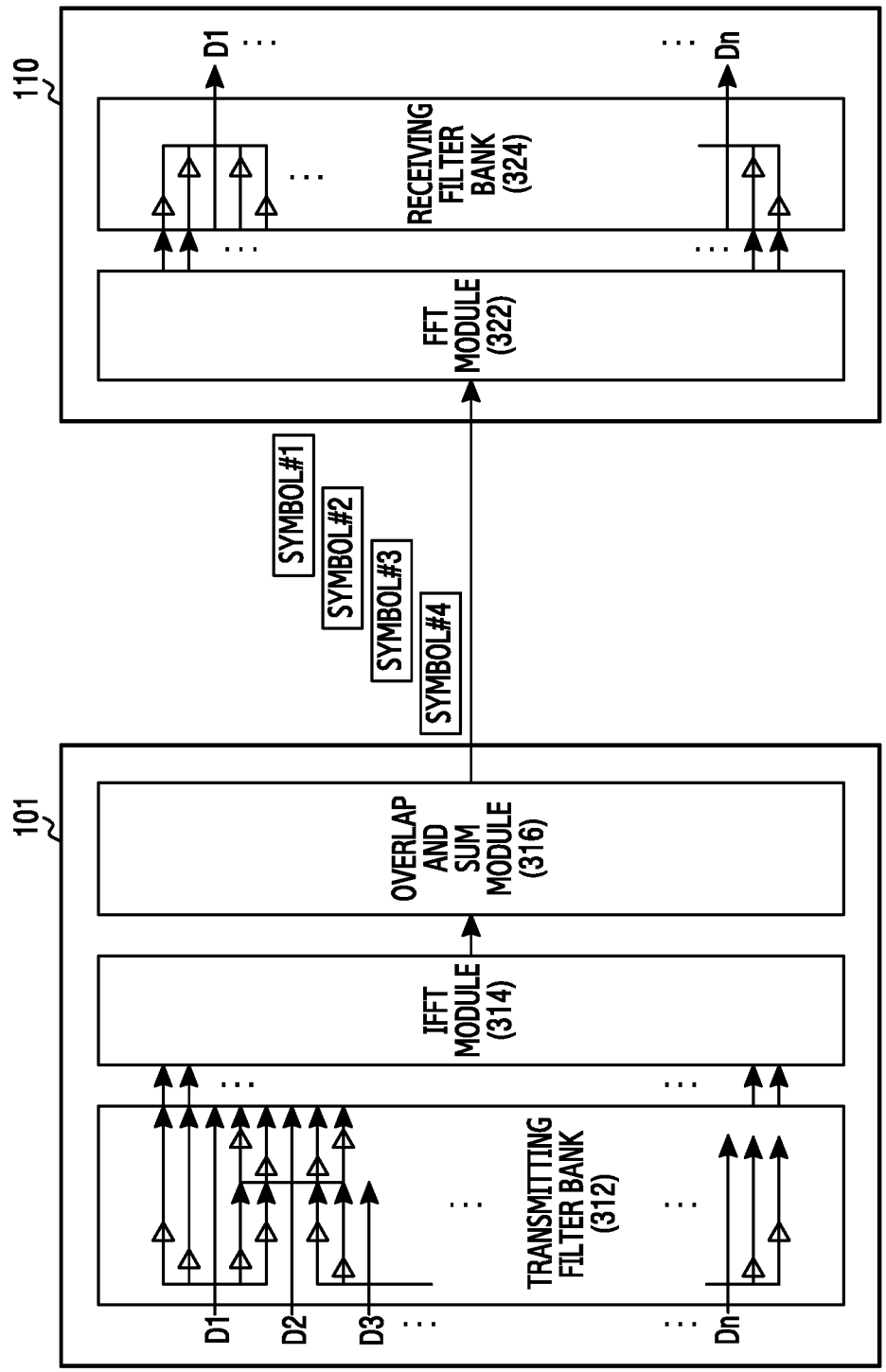
FIG. 3 illustrates an example of functional configurations of a transmitting end and a receiving end for transmitting and receiving an FBMC in a wireless communication system according to an embodiment of the present disclosure.

FIG. 3 illustrates an example of functional configurations of a transmitting end and a receiving end for generating and analyzing FBMC symbols in a wireless communication system according to an embodiment of the present disclosure. FIG. 3 illustrates a case where a filtering is performed in a frequency domain. Hereinafter, the terms used in the following description, such as " . . . unit", " . . . device", and the like can refer to a unit that processes at least one function and operation, which is implemented in hardware or software or can be implemented as a combination of hardware and software.

Referring to FIG. 3, the transmitting end 101 includes a transmitting filter bank 312, an Inverse Fast Fourier Transform (IFFT) module 314, and an overlap and sum module 316. The transmitting end 101 is presented as an example of one of the transmitting ends in FIG. 1. The receiving end 110 includes a Fast Fourier Transform (hereinafter, referred to as "FFT") module 322, and a receiving filter bank 324.

The transmitting filter bank 312 oversamples data symbols D1 to Dn and then filters the same. In FIG. 3, it is described that, as an example, the filter order K is two and the oversampling factor is five (5=2×K+1), but other filter orders and other oversampling factors can be applied. For example, in the case of D1, the transmitting filter bank 312 generates the same sample values as the five D1 values by oversampling D1, and multiplies the five sample values with filter coefficients. Similarly, the transmitting filter bank 312 over-samples each of D2 to Dn and then multiplies the same with the filter coefficients. Here, some of the filtered samples of adjacent data symbols are summed up. For example, the filtered two D1 samples are summed with the filtered two D2 samples, respectively. In this case, one of the adjacent data symbols can be divided into a real value and an imaginary value of a complex symbol such that the summed sampled values is separated by the receiving end 110, or different filters can be applied to the adjacent data symbols.

The IFFT module 314 performs an IFFT operation on the samples of the filtered data symbols output from the transmitting filter bank 312. In other words, the IFFT module 314 generates FBMC symbols including D1 to Dn by using the samples of the filtered data symbols. That is, the IFFT module 314 generates a multi-carrier signal through an IFFT operation. At this time, due to the oversampling of the data symbols D1 to Dn, the length of the FBMC symbols is larger than n, which is the number of data symbols. The overlap and sum module 316 partially overlaps and sums the FBMC symbols generated by the IFFT module 314. The FBMC symbols are not transmitted independently of one another on a time axis, but are transmitted in a partially overlapped state. Specifically, the rear end of the first FBMC symbol overlaps with the front end of the second FBMC symbol. That is, the overlap and sum module 316 arranges FBMC symbols at a predefined interval, and sums up the samples of the FBMC symbols located on the same time to generate a transmission signal. Here, the predefined interval can be n, which is the number of data symbols.

Although not shown in FIG. 3, the receiving end 110 can further include at least one module for transmitting a transmission signal generated by the overlap and sum module 316. The transmission signal generated by the overlap and sum module 316 is a digital baseband signal. Accordingly, the transmitting end can further include at least one module for converting the transmission signal into an analog signal and up-converting the signal into an RF band signal. Thereafter, the transmission signal including the FBMC symbols can be received by the receiving end 110. Similarly, the receiving end 110 can further include at least one module for converting the received signal into a digital baseband signal.

The FFT module 322 performs an FFT operation on the received signal. Here, the FFT module 322 extracts as many samples as the length of one FBMC symbol from the received signal generated by overlapping and summing of FBMC symbols, and performs an FFT operation thereon. The receiving filter bank 324 filters samples corresponding to one FBMC symbol provided from the FFT module 332 and down-samples the same. Accordingly, the data symbols D1 to Dn can be recovered. For example, in order to recover D1, the receiving filter bank 324 multiplies five samples of the received signal samples on which FFT operation has performed with the filter coefficients and sums up the same.

Figure 4:
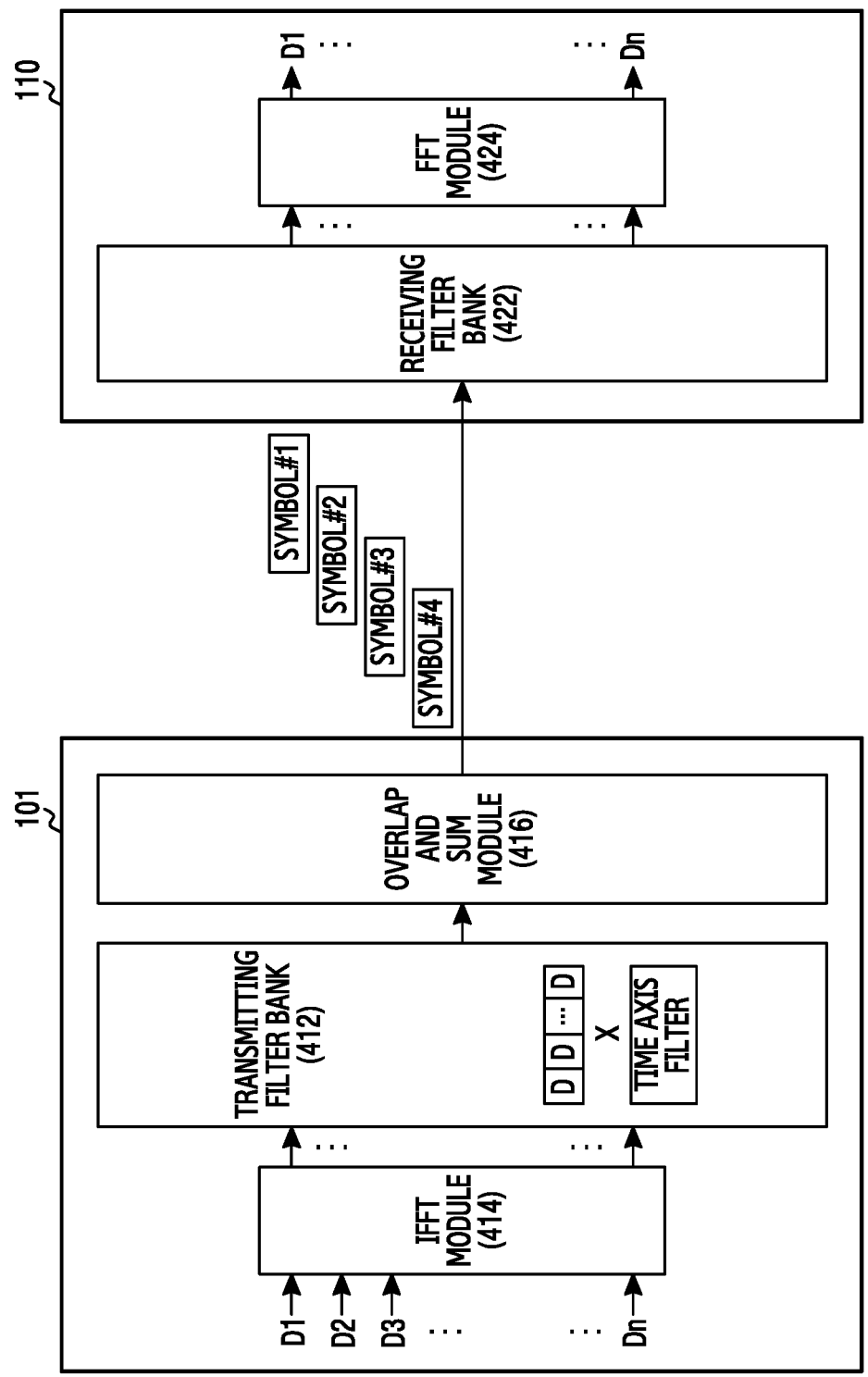
FIG. 4 illustrates another example of the functional configurations of a transmitting end and a receiving end for transmitting and receiving an FBMC symbol in a wireless communication system according to an embodiment of the present disclosure.

FIG. 4 illustrates another example of the functional configurations of a transmitting end and a receiving end for transmitting and receiving FBMC symbols in a wireless communication system according to an embodiment of the present disclosure. The terms used in the following description, such as " . . . unit", " . . . device", and the like can refer to a unit that processes at least one function and operation, which is implemented in hardware or software or can be implemented as a combination of hardware and software.

Referring to FIG. 4, the transmitting end 101 includes an IFFT module 414, a transmitting filter bank 412, and an overlap and sum module 416. The receiving end 110 includes a receiving filter bank 422 and an FFT module 424.

The IFFT module 414 performs an IFFT operation on the data symbols D1 to Dn. Accordingly, the result of the IFFT is equal to n, which is the number of data symbols. The transmitting filter bank 412 performs a time axis filtering on the IFFT result. The transmitting filter bank 412 is a time domain implementation of the transmitting filter bank 312 of FIG. 3 and produces the same output as the IFFT module 314 of FIG. 3. The operation of the transmitting filter bank 312 of FIG. 3 corresponds to a convolution operation on a frequency axis, and the operation in the corresponding time domain can be implemented by signal repetition and filtering. Specifically, the transmitting filter bank 414 replicates IFFT {D}, which is the IFFT result provided from the IFFT module 414, by as much as the filter order of the transmitting filter bank 312 of FIG. 3, and multiplies the same with a transmission filter on the time domain, which corresponds to a frequency domain filter of the transmitting filter bank 312 of FIG. 3. Thus, FBMC symbols are generated.

The overlap and sum module 416 partially overlaps and sums the FBMC symbols generated by the transmitting filter bank 412. The FBMC symbols are not transmitted independently of one another on the time axis, but are transmitted in a partially overlapped state. Specifically, the rear end of the first FBMC symbol overlaps with the front end of the second FBMC symbol. That is, the overlap and sum module 416 arranges the FBMC symbols at a predefined interval and sums up the samples of the FBMC symbols located on the same time so as to generate a transmission signal. Here, the predefined interval can be n, which is the number of data symbols.

Although not shown in FIG. 4, the transmitting end 101 can further include at least one module for transmitting the transmission signal generated by the overlap and sum module 416. The transmission signal generated by the overlap and sum module 416 is a digital baseband signal. Accordingly, the transmitting end can further include at least one module for converting the transmission signal into an analog signal and up-converting the signal into an RF band signal. Thereafter, the transmission signal including the FBMC symbols can be received by the receiving end 110. Similarly, the receiving end 110 can further include at least one module for converting the received signal into a digital baseband signal.

The receiving filter bank 422 performs a time domain filtering using a reception filter corresponding to the transmission filter used in transmitting filter bank 414. Here, the reception filter bank 422 extracts as many samples as the length of one FBMC symbol from the reception signal generated through the overlap and sum of the FBMC symbols, and performs a reception filtering on the same. In addition, the receiving filter bank 422 divides the signal according to the repetition order, and sums the divided signals. As a result, the signal before transmission filtering (e.g., IFFT {D}) can be recovered. The FFT module 424 performs an FFT operation on the signal provided from the receiving filter bank 422. Accordingly, the data symbols D1 to Dn can be recovered.

For the embodiments according to the present disclosure, the following can be assumed at the time of transmission and reception. First, the receiving end can calculate the time synchronization error for each of the signals transmitted by the transmitting ends using techniques such as correlation or blind synchronization. For example, the receiving end side can calculate the time synchronization error using the EVM value in an opposite manner, using the relationship between the EVM and the time synchronization error, or can calculate the time synchronization error for a known signal using a point at which the correlation with the received signal is the highest. Second, each transmitting end uses previously scheduled different radio resources without using a random access scheme. For example, resources orthogonal to each other in the time and frequency domain can be allocated in advance to respective transmitting ends that transmit signals to the receiving end.

Figure 5:
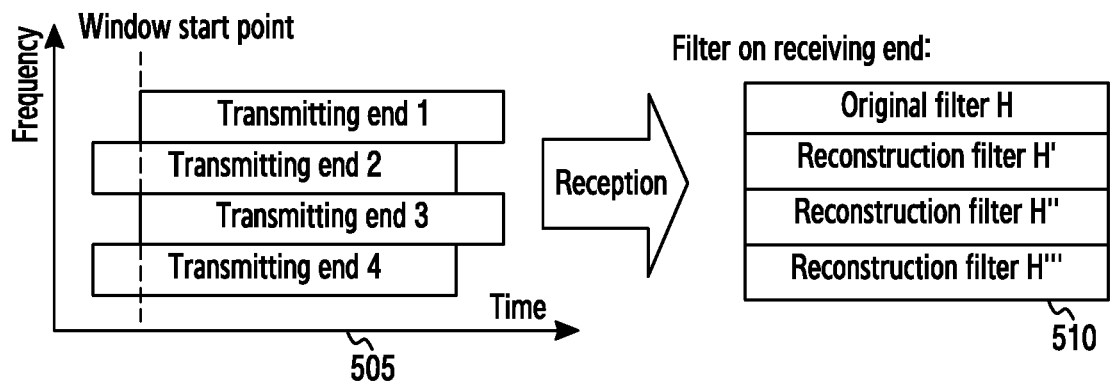
FIG. 5 illustrates an example of a method of configuring a filter for each transmitting end when a time synchronization error between transmitting ends occurs, by a receiving end of an FBMC system according to the present disclosure.

FIG. 5 illustrates an example of a method of configuring a filter for each transmitting end when a time synchronization error between transmitting ends occurs, by a receiving end of an FBMC system according to the present disclosure.

Referring to a graph 505, resources for the transmitting ends 101 to 104 are allocated adjacent to each other in the frequency band. The graph 505 illustrates four transmitting ends, but the number of transmitting ends can be more or less than four. In addition, although it is illustrated that there is no interval between frequencies allocated to transmitting ends, the frequencies can be adjacent with sufficient intervals therebetween. In an embodiment of the present disclosure, the transmitting ends 101 to 104 transmit the FBMC signal to the receiving end according to a predetermined frame. In other words, the transmitting ends can receive a Reference Signal (RS) of the receiving end and the receiving end can simultaneously receive the signals transmitted by the transmitting ends as possible based on the information determined from the reference signal. At this time, resources which are orthogonal to each other in the time and frequency domains are allocated to the signals of the transmitting ends. In addition, in an embodiment of the present disclosure, the receiving end 110 receives the signals transmitted from multiple transmitting ends, and simultaneously processes the signals from the transmitting ends so as to detect the signals. However, the propagation time at which each signal arrives at the receiving end 110 can be different depending on the location and distance of the transmitting ends, and thus the time at which the signals of the transmitting ends scheduled on the same time arrive at the receiving end 110 can be different. The graph 505 illustrates that the start points of the signals transmitted by the transmitting ends 101 to 104 are different from each other. In other words, a time synchronization error can exist between the signals transmitted from the transmitting ends 110 to 104. Although it is illustrated that the start points of the signals for the transmitting end 101 and the transmitting end 103 coincide with a window start point, they may not coincide with the window start point. The receiving end 110 can determine a window start point by considering all the time synchronization errors of the signals transmitted from the transmitting ends. The window can mean a time interval for extracting a reception sample when the receiving end receives as many samples as the filter length, and the window start point can mean the start point of the time interval.

The window start point can be calculated using an average of the time synchronization errors for the signals transmitted by the transmitting ends 101 to 104 or using a separate algorithm for optimizing the reception performance. At the window start point, the time synchronization error can be zero. The time synchronization error can be obtained by using a general correlation-based synchronization estimation method used in the conventional OFDM system such as LTE/LTE-A and the like, or the relationship between the Error Vector Magnitude (EVM) and the time synchronization error, which will be described later in detail. The receiving end 110 extracts, in relation to the received signal, as many reception samples as the filter length based on the window start point, and filters the reception samples using an original filter. The original filter is a filter that is matched with a signal received without a time synchronization error, that is, the start point of a signal is the same as the window start point, and indicates a filter which maximizes the power of the received signal so that the receiving end 110 has an optimum reception performance. The original filter can be a common filter used in the receiving end 110 of the wireless communication system. In other words, the receiving end 110 can filter the signals transmitted by the transmitting ends 101 to 104 by using one original filter.

In an OFDM-based system, a Guard Interval (GI) referred to as a Cyclic Prefix (CP) exists. In the OFDM-based system, even when there is a difference in the time synchronization errors between signals transmitted from the transmitting ends 101 to 104, the shape of the summed signal received by the receiving end 110 does not largely change from a rectangular filter shape due to the CP or GI. In other words, Inter-User Interference (IUI) does not occur because the orthogonality between carriers is maintained. However, since GI such as the CP does not exist in the FBMC-based system, when there is a difference in time synchronization errors between signals transmitted from the transmitting ends 101 to 104, the orthogonality between the transmitting-end filter and the receiving-end filter is disrupted, and thus the Inter-channel interference (ICI) and IUI can occur. In the FBMC system, when the transmitting end filter performs a convolution operation with the receiving end filter, a filter satisfying the Nyquist sampling criterion is acquired. When a signal that has passed through a receiving end filter satisfying the Nyquist sampling standard is sampled, the signal is detected in a desired portion and an independent sample is detected in the remaining portion. In other words, when a signal has passed through the receiving end filter satisfying the Nyquist sampling standard and then is sampled, one sample does not affect the remaining samples. However, when there is a difference in time synchronization errors between the signals transmitted from the transmitting ends 101 to 104, and the signal having passed through the receiving end filter is sampled, the Nyquist sampling standard is not satisfied. In this case, one sample will affect the remaining samples. That is, Inter-Symbol Interference (ISI) can occur and the orthogonality between carriers is disrupted, so that ICI and IUI can occur.

As described above, since GI such as a CP does not exist in the FBMC system, when a single original filter, that is, a common filter is applied to a signal received by a receiving end, ISI, ICI, and IUI can occur due to the difference in time synchronization errors between signals transmitted by the transmitting ends. According to the graph 505, since the time synchronization error between the transmitting end 1 and the transmitting end 3 is zero, that is, the window start point coincides with the start point of the signal of the transmitting end 1, a detection error may not occur even when the original filter is used. However, since there is a time synchronization error between the transmitting end 2 and the transmitting end 4, that is, the start point of the signal and the window start point do not coincide with each other, a detection error can occur when the original filter is used. Therefore, a method of reconfiguring a filter that minimizes or reduces performance deterioration in consideration of time synchronization errors of all transmitting ends is required. The present disclosure provides a method of designing a reception filter considering the time synchronization error in order to reduce the ISI, ICI, and IUI in the FBMC system and to minimize or reduce reception performance degradation caused by the difference in time synchronization errors. In an embodiment of the present disclosure, a method of reducing reception performance degradation by applying an individual filter to signals transmitted by the transmitting ends 101 to 104, based on the estimated time synchronization error is provided. In FIG. 5, the receiving end side filter 510 indicates different reconstruction filters configured in consideration of the time synchronization error for each of the signals transmitted by the transmitting end 1 to the transmitting end 4. Each filter in the receiving end side filter 510 is shown to correspond to the transmitting ends in a horizontal line in order to indicate that each filter corresponds to a filter for the transmitting end 1 to the transmitting end 4. Although it is shown that a filter corresponding to the transmitting end 1 is referred to as an original filter, when a time synchronization error exists in the transmitting end 1, that is, when the start time of the signal of the transmitting end 1 does not coincide with the window start point, the filter corresponding to the transmitting end 1 can be another reconstruction filter rather than the original filter. In addition, although four filters are shown in the receiving end side filter 510, the number of filters can be four or more or less than four depending on the number of transmitting ends. The receiving end 110 can copy the summed signal received from the transmitting end 1 to the transmitting end 4 and perform filtering the same in parallel on the respective reconstruction filters formed on the receiving end side filter 510. The reconstruction filter can be configured by delay shifting or advance shifting the original filter with respect to the time axis. For example, when the start point of a signal transmitted by an arbitrary transmitting end is behind the window start point, the reconstruction filter can be configured by delaying the original filter by the difference between the start point of the signal and the window start point, that is, by delaying as much as the time synchronization error. In another example, when the start point of a signal transmitted by the transmitting end is further ahead in time than the window start point, the reconstruction filter can be configured by advancing the original filter by the difference between the start point of the signal and the window start point, that is, as much as the time synchronization error. A detailed embodiment of a method for configuring a reconstruction filter is described in detail below.

Figure 6:
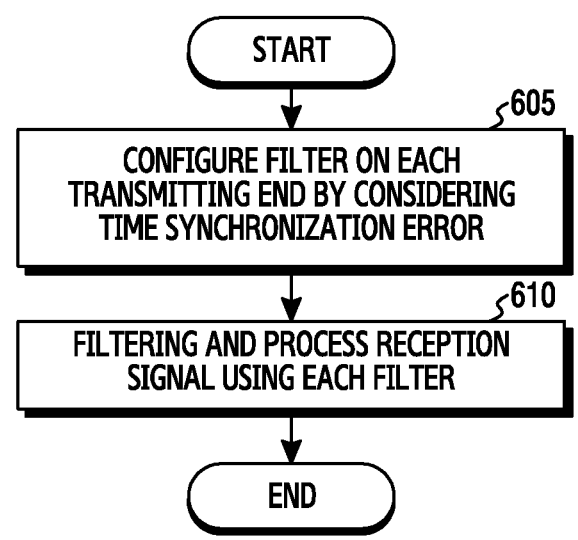
FIG. 6 is a flowchart illustrating a method of configuring a filter for each transmitting end in consideration of a time synchronization error between transmitting ends, by a receiving end of an FBMC system according to the present disclosure.

FIG. 6 is a flowchart illustrating a method of configuring, by a receiving end of an FBMC system, a filter for each transmitting end in consideration of a time synchronization error between transmitting ends according to the present disclosure.

In step 605, the receiving end 110 configures a filter for each transmitting end in consideration of the time synchronization error of the signals transmitted from the transmitting ends 101 to 104. The filter for each transmitting end can be configured by forward-shifting or delay-shifting the original filter with respect to the time axis as much as a time synchronization error.

In step 610, the receiving end 110 filters and processes the received signal using each filter. In other words, in step 610, the receiving end 110 can copy the summed signals transmitted by the transmitting ends 101 to 104 by the number of filters, for example, the number of transmitting ends, and filter the same through respective filters configured in step 605.

Figure 7:
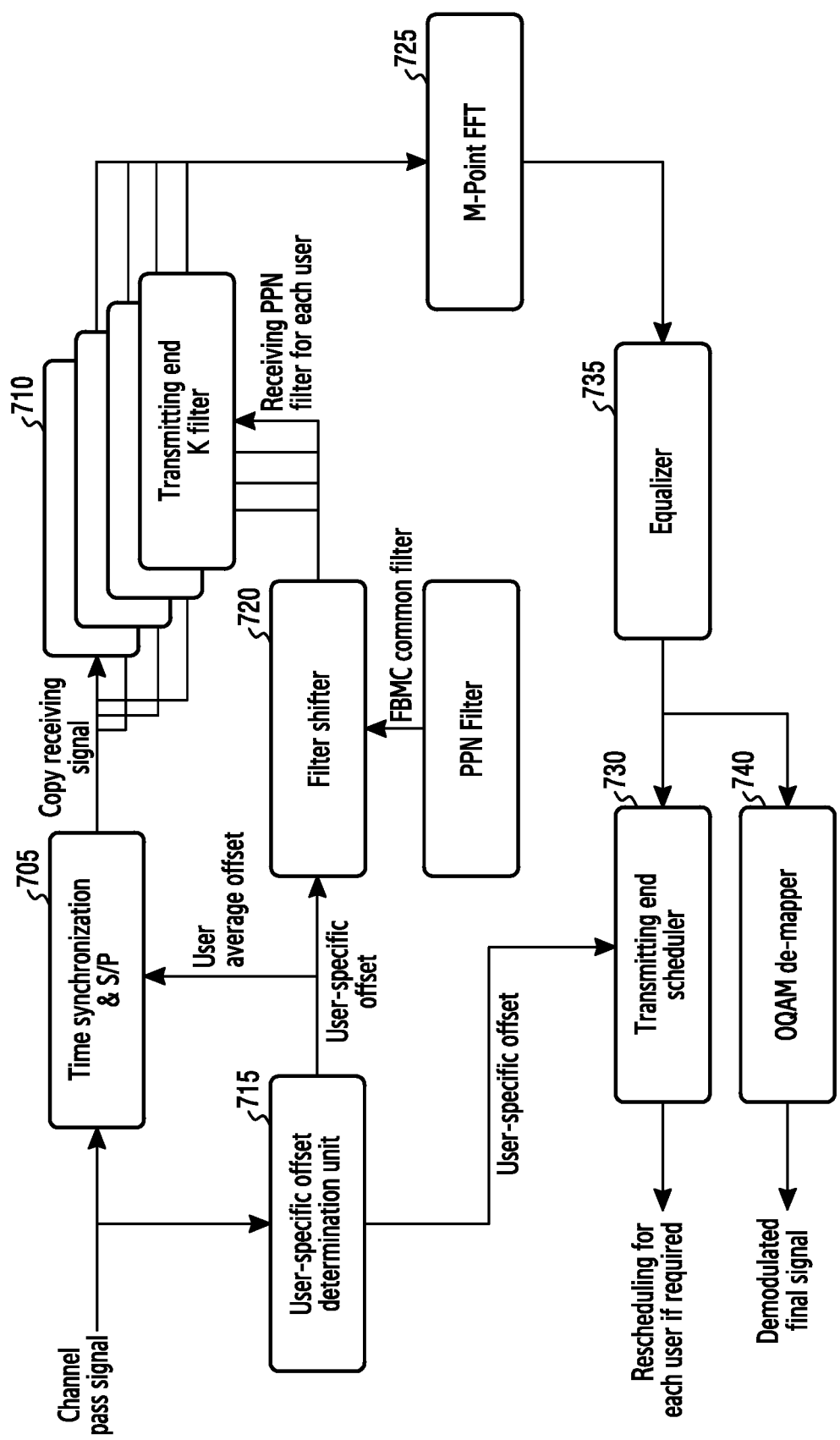
FIG. 7 illustrates an example of a detailed block configuration of a receiving end device for configuring a filter for each transmitting end according to the present disclosure.

FIG. 7 illustrates an example of a detailed block configuration of a receiving end device for configuring a filter for each transmitting end according to the present disclosure. The signals transmitted by the transmitting ends 101 to 104 are passed through the channel, and then received by the receiving end 110. The channel pass signal can move to a time synchronization and serial to parallel (S/P) block 705 or a user-specific offset determination unit 715, or can move to both of them. The time synchronization and S/P block is a block for finding a start point of a symbol using a time synchronization technique, for example, a correlation technique, and framing the signal in unit of a symbol. In other words, in order to generate N parallel symbol streams, the serial modulated symbols are converted (i.e., de-multiplexed) into parallel data. The N can be the magnitude of IFFT/FFT used in the receiving end 110 and the transmitting ends 101 to 104. When the number of subcarriers is M, since a filter for each transmitting end in a transmitting end K filter 710 receives a signal input by M number of units, the time synchronization and S/P block performs blocking of incoming signals by M number of units. The signal that has passed the time synchronization and S/P 705 is copied for performing filtering and moved to the transmitting end K filter 710. The transmitting end K filter 710 includes a filter, that is, a reconstruction filter, which reconstructs the original filter in consideration of the time synchronization error of each of the signals transmitted from the transmitting ends 101 to 104. The reconstruction filters can be configured to correspond to respective transmitting ends. The copied signal can be filtered in parallel by each reconstruction filter configured in the transmitting end K filter 710. Signals which have passed through respective reconstruction filters configured in the transmitting end K filter are integrated so as to pass through a single M-point FFT 725. In other words, the M-point FFT 725 integrates signals filtered through the filters reconstructed for respective transmitting ends and performs a single Fast Fourier Transform (FFT) operation thereon so as to detect a frequency axis signal. The present disclosure provides a method and apparatus which can separate a block for performing an FFT and a Polyphaser Network (PPN) filter so as to perform filtering on each transmitting end, and sum the filtered signals so as to perform a single FFT on the same. The user-specific offset determination unit 715 determines an offset, that is, a time synchronization error for each of the signals of each of the transmitting ends 101 to 104 included in the channel pass signal. The time synchronization error can be determined using a general correlation-based synchronization estimation method used in a conventional OFDM system such as LTE/LTE-A or the relationship between the error vector magnitude (EVM) and the time synchronization error. The time synchronization error for each transmitting end, which is determined through the user-specific offset determination unit 715 can be used, by the transmitting end scheduler 730, for rescheduling the frequency bands of the transmitting ends, or can be used, by a filter shifter 720, for configuring a reconstruction filter for each transmitting end from a PPN filter, that is, an FBMC common filter. The common filter is a filter that is matched with the signal received without a time synchronization error and maximizes the power of the received signal so that the receiving end 110 has optimum receiving performance. The common filter is an original filter for reconstructing, by the transmitting end K filter 710, a filter for each transmitting end. The transmitting end scheduler 730 can reallocate frequencies allocated to respective transmitting ends, if necessary. In other words, when the Inter-User Interference (IUI) between the signals transmitted by the respective transmitting ends is equal to or greater than a predetermined value, the frequency reallocation can be performed. The frequency band reallocation can be performed in consideration of the time synchronization errors calculated by the user-specific offset determination unit 715.

The equalizer 735 is to correct the distortion that can occur with respect to a signal that has passed through the M-point FFT 725. The equalizer 735 combines the characteristics of the signals to equalize the same. In other words, the equalizer 735 can reduce the effect of ISI occurring due to the amplitude distortion or phase distortion on a transmission line. The equalizer 735 includes an analog equalizer and a digital equalizer. The analog equalizer can be used when the transmission line does not rapidly change over time by making the long-term ISI to zero. The digital equalizer can make the ISI to zero while changing a transfer function when the transmission line varies over time. The signal having passed through the equalizer 735 can be used in the transmitting end scheduler 730 or can be used in an Offset Quadrature Amplitude Multiplexing (OQAM) demapper. The OQAM de-mapper demodulates the signal having passed through the equalizer 735 in the same manner as the modulation method at the transmitting end so as to generate a final signal.

Figure 8:
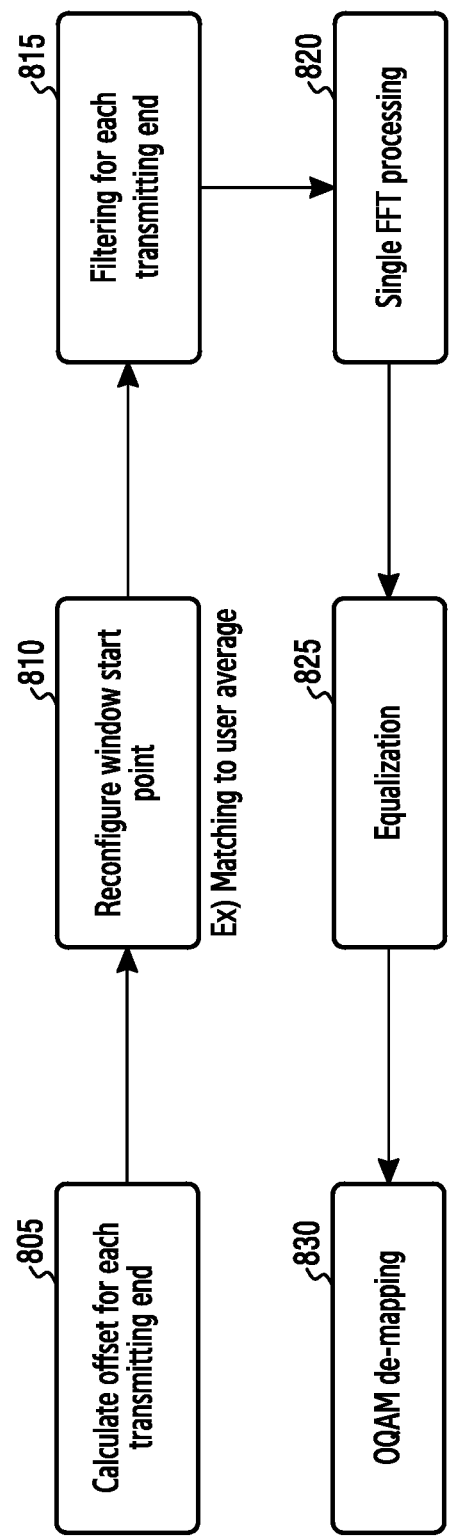
FIG. 8 is a flow chart illustrating a process of performing filtering and a single FFT on each transmitting end according to an embodiment of the present disclosure.

FIG. 8 is a flow chart illustrating a process of performing filtering and a single FFT on each transmitting end according to an embodiment of the present disclosure. The receiving end 110 receives a signal from the transmitting ends, and calculates an offset for each transmitting end in step 805. The offset for each transmitting end can be calculated by using a general correlation-based synchronization estimation method used in the conventional OFDM system such as LTE/LTE-A or the relationship between the Error Vector Magnitude (EVM) and the time synchronization error. In the present patent document, the offset for each transmitting end is used in the same meaning as the time synchronization error. In step 810, the window start point is reconfigured using the offset for each transmitting end calculated in step 805. In other words, in step 805, the window start point can be calculated using an average of the time synchronization errors for the signals transmitted from the transmitting ends or using a separate algorithm for optimizing the reception performance. The time synchronization error can be zero at the window start point. In step 815, the receiving end 110 performs filtering on each transmitting end for the signals transmitted from the transmitting ends. In other words, the receiving end 110 configures a reconstruction filter for each transmitting end by using the offset for each transmitting end calculated in step 805, copies signals transmitted from the transmitting ends, and performs filtering in parallel through each of the reconstructed filters. The reconstruction filter can be configured by delay shifting or advance shifting an original filter, with respect to the time axis, that is, a filter that is matched to the signal received without a time synchronization error. In step 820, signals having passed through respective reconstruction filters are integrated so as to perform a single FFT process. In other words, a single Fast Fourier transform (FFT) operation is performed on a signal obtained by integrating signals having passed through respective reconstruction filters, so that a signal on a frequency axis is detected. In step 825, the signals on which FFT is performed are equalized. The equalization includes an operation of reducing the effect of ISI generated due to amplitude distortion or phase distortion on the transmission line. In operation 830, OQAM de-mapping is performed on the signal equalized in step 825. Through the OQAM de-mapping process, the demodulated signal can be finally obtained.

Figure 9:
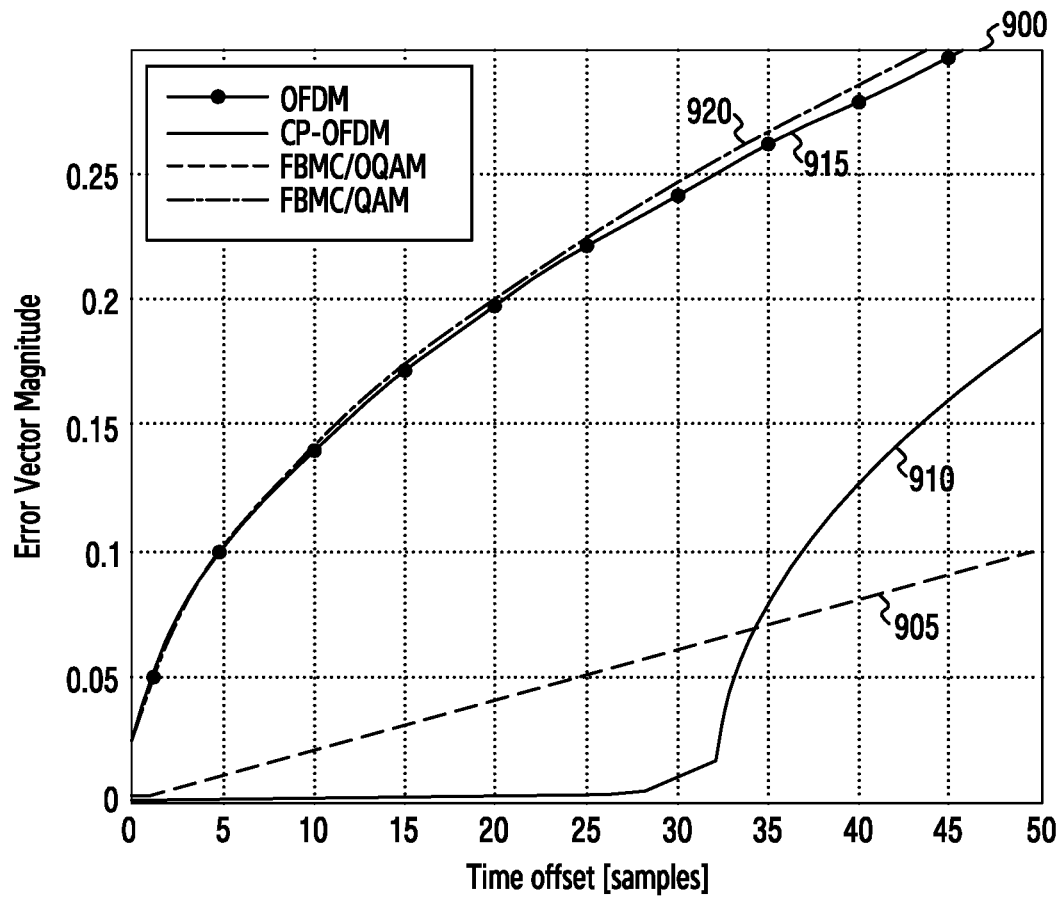
FIG. 9 is a graph showing a relationship between a time synchronization error and EVM in a wireless communication system according to an embodiment of the present disclosure.

FIG. 9 is a graph showing the relationship between a time synchronization error and an EVM in a wireless communication system according to an embodiment of the present disclosure. Reference numeral 910 can be the EVM of the FBMC/OQAM with respect to the time synchronization error, and reference numeral 930 can be the EVM of the CP-OFDM with respect to the time synchronization error. In addition, reference numeral 950 can be the EVM of the OFDM with respect to the time synchronization error, and reference numeral 970 can be the EVM of the FBMC/QAM with respect to the time synchronization error. The EVM according to the time synchronization error is merely an example, and can have different values depending on the state of the channel.

Referring to the graph, the EVM and the time synchronization error can have a one-to-one correspondence. In other words, in each of the systems, for example, when Orthogonal Frequency Division Multiplexing (OFDM) 915, Cyclic Prefix based OFDM (CP-OFDM) 910, FBMC/OQAM 905, and FBMC/QAM 920 have the time synchronization errors, the EVM can be determined. On the contrary, when the EVM is given in each system, the time synchronization error can be determined. The EVM can be calculated by the following equation.

$$EVM=(1/SNR) \qquad [\text{Equation 1}]$$

In equation (1), SNR can be calculated by equation (2) as follows.

$$SNR=(P-N)/N \qquad [\text{Equation 2}]$$

In Equation (2), SNR is the signal-to-noise ratio, N is the average noise power, and P is the sum of the average noise power N and the average signal power.

The receiving end 110 can store the relationship between the EVM 910 and the time synchronization error, in the storage unit 220 of FIG. 2, as a table. In FIG. 9, it can be seen that, for example, when the value of EVM is 0.05, the time synchronization error is approximately 25. Alternatively, when the EVM value is 0.1, it can be seen that the time synchronization error is approximately 50. However, through FIG. 9, only the size of the time synchronization error can be known, and the sign thereof cannot be known. This is because the FBMC symbol has symmetrical features. The EVM 910 of FMBC/OQAM has a graph which is unaffected by the change of the channel and a persistent channel determination makes it possible to compensate for the graph.

The time synchronization error can be estimated using the correlation and the time synchronization error can be estimated from the EVM using the relationship between the EVM and the time synchronization error. In a multi-subcarrier scheme such as OFDM, a synchronization scheme using a correlation scheme based on a Reference Signal (RS) can be applied. The synchronization scheme can be applied not only to the OFDM system but also to the FBMC system. The correlation method is a method for determining a point at which a peak value occurs by correlation-estimating an already known signal with a reception signal, that is, determining a point having the highest degree of correlation as a time synchronization point. In other words, the time synchronization estimation using the correlation can use the Schmidl and Cox algorithm or the Minn algorithm. The Schmidl and Cox algorithm and the Minn algorithm are referred to in the following documents.

"Schmidl, T. M.; Cox, D. C., "Robust frequency and timing synchronization for OFDM," in Communications, IEEE Transactions on, vol. 45, no. 12, pp. 1613-1621, December 1997"

"Minn, H.; Zeng, M.; Bhargava, V. K., "On timing offset estimation for OFDM systems," in Communications Letters, IEEE, vol. 4, no. 7, pp. 242-244, July 2000"

For example, the receiving end 110 can determine a time synchronization point for each of the signals by correlating the previously-known signals with respect to each of the signals received from the transmitting ends. The time synchronization point can be determined as a point at which a peak value occurs as a result of the correlation estimation for each signal. The receiving end 110 can determine a time synchronization error for each signal based on the time synchronization point estimated for each of the signals. For example, the receiving end 110 can calculate an average value of the estimated time synchronization values for each of the signals, and can determine the difference between the average value and the time synchronization value for each of the signals, as a time synchronization error.

In the present disclosure, as a time synchronization estimation method using a correlation technique, the Schmidl and Cox algorithm and the Minn algorithm are given as examples, but these are merely examples, and the time synchronization can be estimated through correlation using algorithms other than the Schmidl and Cox algorithm or the Minn algorithm.

Figure 10:
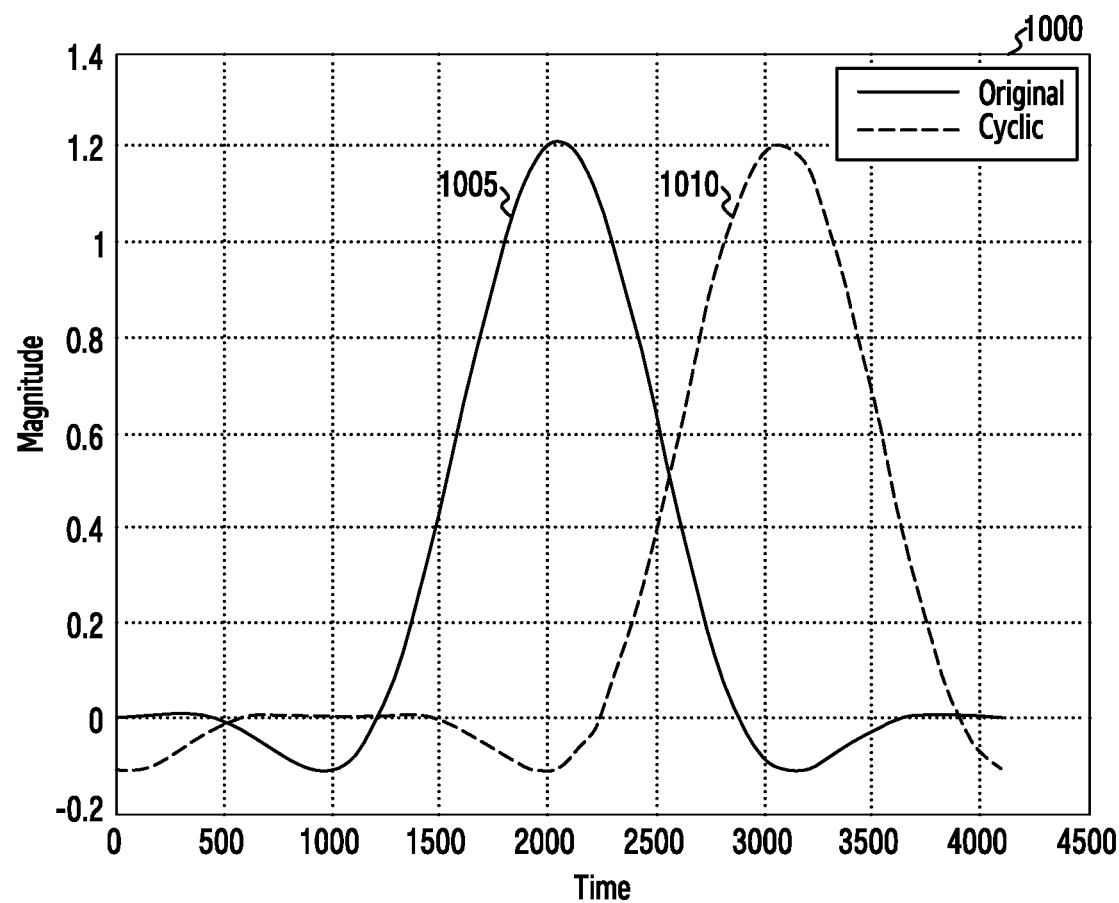
FIG. 10 is a graph showing a time domain waveform of a cyclic shift filter according to an embodiment of the present disclosure.

FIG. 10 is a graph showing a time domain waveform of a cyclic shift filter according to an embodiment of the present disclosure. A waveform 1005 represents an original filter. The original filter is a filter that is matched with a signal received without a time synchronization error, that is, the start point of a signal is the same as a window start point. The original filter can be a filter that maximizes the power of a signal received by the receiving end 110, so that the receiving end 110 has optimum reception performance. In an OFDM-based system, a Guard Interval (GI) called a Cyclic Prefix (CP) exists. In the OFDM-based system, even when there is a difference in time synchronization errors between signals transmitted from the transmitting ends 101 to 104, the shape of the total summed signal received by the receiving end 110 due to the CP or GI does not largely change from a rectangular filter shape. In other words, since the orthogonality between the carriers is maintained, the Inter-User Interference (IUI) does not occur even when the signals transmitted from the transmitting ends 101 to 104 are filtered using one original filter. However, in the FBMC-based system, GI such as the CP does not exist. In other words, when there is a difference in time synchronization errors between signals transmitted from the transmitting ends 101 to 104, the orthogonality between the transmitting-end filter and the receiving-end filter is disrupted and Inter-Channel Interference (ICI) and IUI are generated. Accordingly, in the present disclosure, in order to reduce the occurrence of ICI and IUI between signals transmitted by the transmitting ends in the FBMC system, a method is provided, which can configure a filter for each transmitting end by reconstructing an original filter in consideration of a time synchronization error. In an embodiment of the present disclosure, a method of constructing a filter for each transmitting end by shifting the original filter on the time axis is provided. That is, a method is provided, which can perform matched filtering through the original filter by shifting the same on the time axis by as much as a time synchronization error for each transmitting end. A waveform 1010 shows a waveform of a filter obtained by shifting the waveform 1005 on the time axis. In other words, the waveform 1010 shows the waveform of the filter shifting the original filter. For example, when the window start point calculated from the signals received by the transmitting ends 101 to 104 is the 2048th samples, and when the time synchronization error of the transmitting end 101 is the 1024 samples, the original filter is shifted by the time corresponding to the 1024 samples so that the matched filtering on the signal transmitted by the transmitting end 101 can be performed. FIG. 10 shows a waveform 1010 of the filter reconstructed by delay-shifting the original filter waveform 1005 by a time synchronization error. FIG. 5 shows a waveform when the original filter is delay-shifted, but the original filter can be advanced-shifted according to the direction of the time synchronization error. For example, the waveform 1010 of FIG. 10 indicates a waveform of the reconstruction filter in which, when the start point of a signal transmitted by a transmitting end is behind the window start point in time, the reconstruction filter is configured by delaying the original filter by the difference between the start point of the signal and the window start point, that is, by delaying the original filter by the time synchronization error. However, when the start point of a signal transmitted from an arbitrary transmitting end is ahead of the window start point in time, the reconstruction filter can be configured by advancing the original filter by the difference between the start point of the signal and the window start point, that is, as much as the time synchronization error.

When the original filter is shifted with respect to the time axis, there will be a portion having passed from an area where the filter is not defined. For example, for the original filter waveform 1005 of FIG. 10, since the filter is not defined in an area in which the time is less than zero, when the original filter is delay-shifted, the waveform of the filter may not be defined in an area corresponding to time zero to the delay-shifted time. In order to perform filtering at the receiving end, a filter value has to be defined for an area where the waveform of the filter may not be defined. FIG. 10 shows a waveform 1010 where a filter value of an area in which a waveform of the filter may not be defined is defined as a cyclic value. In other words, the waveform 1010 shows a waveform where a value of a portion to be truncated at the right side of the original filter waveform 1005, when the original filter is delay-shifted, is defined as a filter value of an area where the waveform may not be defined. In the present patent document, a filter that is reconstructed by shifting an original filter using the above-described method is defined as a cyclic shift filter. FIG. 10 shows only the cyclic shift filter waveform 1010 when the original filter is delay-shifted, but the waveform when the original filter is advanced (forward-shifted) according to the time synchronization error can also be considered. For example, the waveform 1010 can represent a waveform where a value of a portion to be truncated at the left side of the original filter waveform 1005, when the original filter is forward-shifted, is defined as a filter value of an area where the waveform may not be defined.

Figure 11:
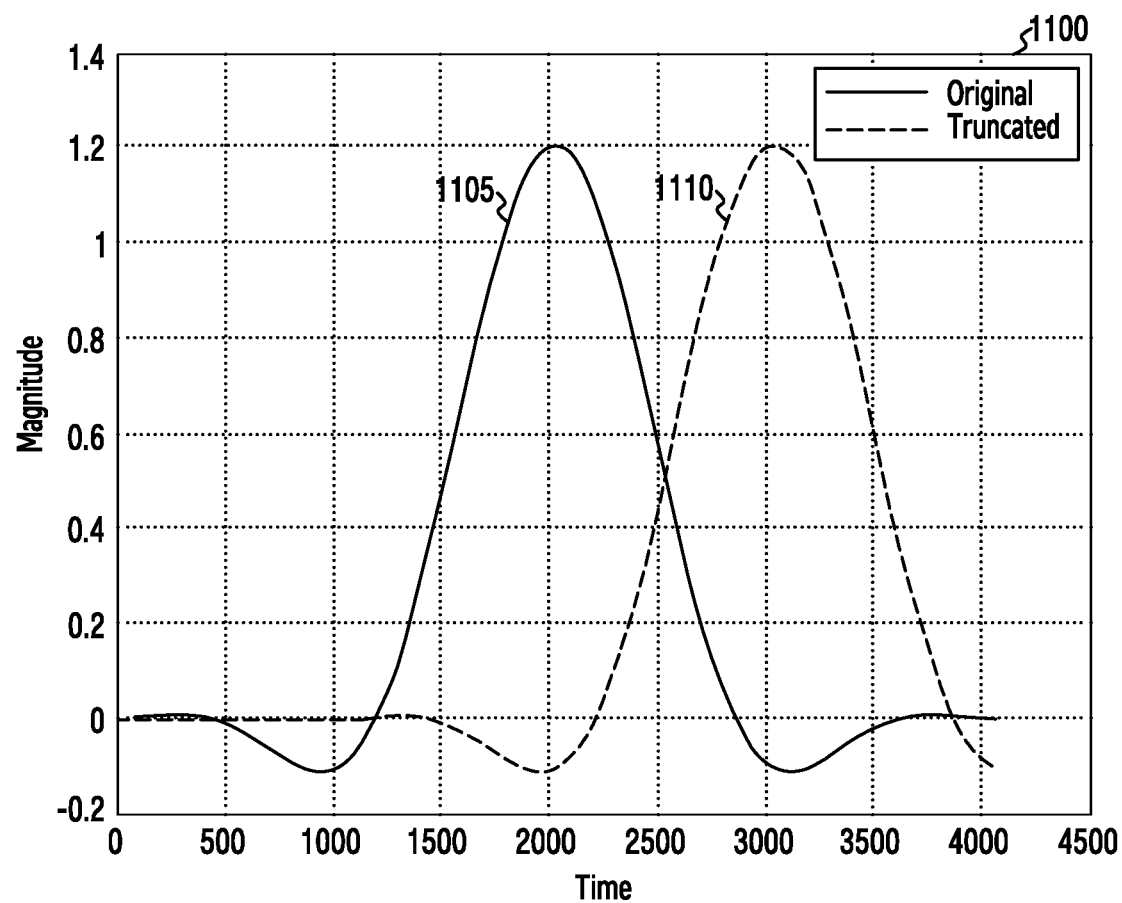
FIG. 11 is a graph showing a time domain waveform of a truncated shift filter according to an embodiment of the present disclosure.

FIG. 11 is a graph showing the time domain waveform of a truncated shift filter according to an embodiment of the present disclosure. A waveform 1105 represents the waveform of the original filter. A waveform 1010 represents the waveform of the filter reconstructed by shifting the original filter. Conditions and methods of shifting the original filter are the same as those in FIG. 10. In other words, when the start point of a signal transmitted by an arbitrary transmitting end is behind the window start point in time, the reconstruction filter can be configured by delaying the original filter by the time synchronization error corresponding to the difference between the start point of the signal and the window start point. Alternatively, when the start point of a signal transmitted from an arbitrary transmitting end is ahead of the window start point in time, the reconstruction filter advances the reference point by a time synchronization error corresponding to the difference between the start point of the signal and the window start point. FIG. 11 provides another method of defining, when the original filter is shifted with respect to the time axis, a filter value of an area where the waveform of the filter may not be defined. FIG. 11 shows a waveform 1110 where a filter value of an area in which the waveform of the filter may not be defined is defined as zero (zero padding). In other words, the waveform 1110 represents a waveform where a filter value, of an area in which the waveform generated on the right side may not be defined, is defined as zero, when the original filter is delay-shifted. In the present patent document, the filter reconstructed by shifting the original filter using the above-described method is defined as a truncated shift filter. The truncated shift filter is characterized by having filter energy to be zero, for an area in which a filter value is not defined, in order to minimize or reduce the Inter User Interference (IUI) due to a time synchronization error. FIG. 11 shows only the truncated shift filter waveform 1110 when the original filter is delay-shifted, but a waveform when the original filter is forward-shifted according to the time synchronization error can also be considered. For example, the waveform 1110 can represent a waveform where a filter value of an area in which a waveform generated on the right side of the original filter waveform 1005 may not be defined, is defined as zero, when the original filter is forward-shifted.

When a signal transmitted from an arbitrary transmitting end is filtered using the cyclic shift filter in FIG. 10 in consideration of the time synchronization error existing in the signal, the Inter Symbol Interference (ISI) may not occur in the transmitting end. In other words, the entire shape of the waveform 1010 maintains the waveform 1005 of the original filter as it is, so that the orthogonality of the filter is not disrupted. In this case, the ISI does not occur in the transmitting end, but ISI and Inter-Channel Interference (ICI) between the transmitting ends can occur because the orthogonality of filter between the transmitting end and the other transmitting end that transmits a signal in the same frame as the transmitting end is disrupted.

In addition, a signal transmitted from an arbitrary transmitting end is filtered using the truncated shift filter in FIG. 11 in consideration of the time synchronization error existing in the signal, the Inter Symbol Interference (ISI) and ICI can occur in the transmitting end. In other words, since the waveform 1110 of the truncated shift filter corresponds to a waveform of a filter in which the filter value of an undefined area due to the shift is set to zero, the entire shape of the waveform 1110 does not maintain the waveform 1105 of the original filter. That is, the orthogonality of the filter is disrupted. In this case, the ISI does not occur between the transmitting end and the other transmitting end that transmits a signal in the same frame as the transmitting end, but the ISI and ICI are generated in the transmitting end because the orthogonality of the filter itself is disrupted.

According to the above description, both the cyclic shift filter and the truncated shift filter have disadvantages. In other words, when filtering is performed using the cyclic shift filter, the ISI and Inter-Channel Interference (ICI) can occur between transmitting ends that transmit signals in the same frame to the receiving end. When filtering is performed using the truncated shift filter, the ISI and ICI are generated for the signal transmitted by one transmitting end. However, the above-described disadvantages can be offset by the reception performance improvement obtained when filtering is performed on each transmitting end for the signals transmitted by the transmitting ends using the cyclic shift filter or the truncated shift filter. In other words, the positive effects according to the performance improvement of the receiving end, which can be obtained by performing matched filtering using shifted filters, are greater than a negative influence caused by the cyclic shift filter or the truncated shift filter. The effects of the performance improvement of the receiving end which can be obtained by performing the matched filtering using the shifted filters will be described in detail below.

FIGS. 10 and 11 show examples of a method of configuring a filter for each transmitting end in consideration of the time synchronization error of the transmitting ends that transmits signals to one transmitting end according to the present disclosure. The waveforms of the filters used in FIGS. 10 and 11 have bell-shaped waveforms, but other shapes of waveforms can be used depending on the purpose. In addition, as a method for newly defining a filter value of an area in which a filter is not defined that can be generated by shifting the original filter with respect to the time axis, the present disclosure suggests a method in which a value of a truncated portion due to a filter shift is defined as a filter value (cyclic shifted filter) and a filter value of the undefined area is defined as zero (a truncated shift filter), but other methods for improving reception performance can be used. In addition, the present disclosure provides, as a method for configuring a filter for each transmitting end, a method of shifting the original filter with respect to the time axis in consideration of the time synchronization error of the transmitting ends, but the method of configuring the filter for each transmitting end is not limited to shifting the original filter with respect to the time axis.

Figure 12:
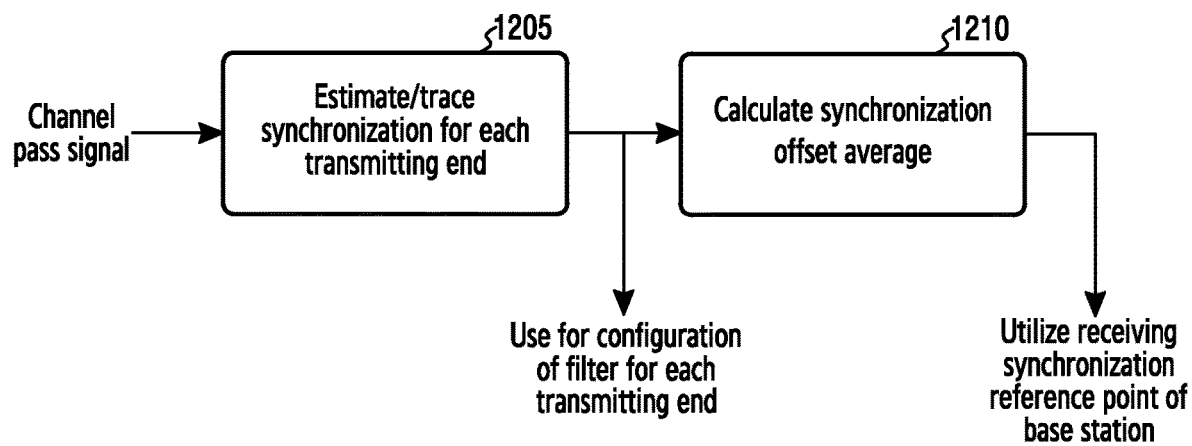
FIG. 12 is a flow chart illustrating of processing a channel pass signal according to an embodiment of the present disclosure.

FIG. 12 is a flow chart illustrating the processing of a channel pass signal according to an embodiment of the present disclosure. In step 1205, the synchronization for each transmitting end is estimated using the channel pass signal. In other words, in step 1205, the receiving end 110 receives the signals transmitted by the transmitting ends 101 to 104 and calculates a time synchronization error for each signal. The time synchronization error can be obtained by using a general correlation-based synchronization estimation method used in conventional OFDM systems such as LTE/LTE-A or the relationship between the Error Vector Magnitude (EVM) and the time synchronization error. The time synchronization error for each transmitting end signal, which is calculated in step 1205, is used to configure a filter for each transmitting end. As an example of a method of configuring filter for each transmitting end, it can be considered to shift the original filter by a time synchronization error on the time axis. The original filter is a filter that is matched with a signal received without the time synchronization error and represents a filter that maximizes the power of a received signal so that the receiving end 110 has optimum reception performance. The original filter can be a common filter used in the receiving end 110 of the wireless communication system.

In step 1210, a synchronization offset average is calculated using the time synchronization error for each transmitting end signal, which is calculated in step 1205. In the present patent document, the offset can be used with the same meaning as the time synchronization error. The average of the synchronization offsets can be utilized as the reception synchronization reference point in reception end. In other words, the receiving end 110 can set a reference time at which the receiving end 110 receives as many samples as the filter length by using the average of the synchronization offset. However, the reception synchronization reference point in the reception end is not limited to the setting using the average of the synchronization offsets, but it can be calculated using a separate algorithm that optimizes the reception performance. The receiving synchronizing reference point in the receiving end can be used with the same meaning as the window start point.

Figure 13A:
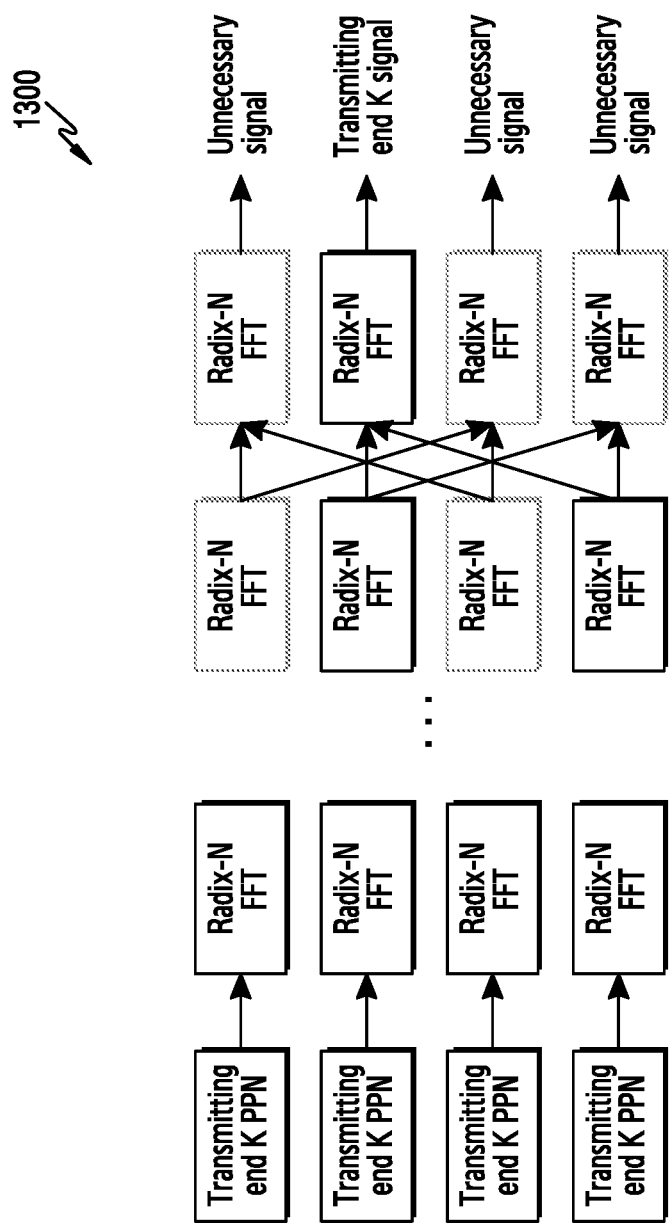
FIGS. 13A and 13B show a Fast Fourier transform (FFT) diagram of a butterfly structure according to an embodiment of the present disclosure.

FIG. 13A shows a Fast Fourier Transform (FFT) diagram of a butterfly structure according to an embodiment of the present disclosure. According to the present disclosure, a receiving end integrates signals filtered through a filter reconstructed for each transmitting end to detect a frequency-axis signal, and perform a single FFT operation thereon. In other words, in the conventional FBMC structure, the filtering process is performed together with the FFT operation however, in the present disclosure, the PPN filter and the filter performing the FFT are separated from each other to enable a filtering on each transmitting end, and the filtered signals are integrated to perform a single FFT on the same. FIG. 13 shows a Fast Fourier Transform (FFT) diagram of a butterfly structure in order to minimize or reduce the implementation complexity. In the FFT algorithm, the butterfly structure refers an integration of the results of a smaller Discrete Fourier Transform (DFT) into a larger DFT, or to a division of the larger DFT operation into sub-transforms. The butterfly structure can be used in the Cooley-Tukey FFT algorithm. According to the Cooley-Tukey FFT algorithm, a DFT having the size n is recursively divided into a smaller r number of DFTs having the size m. In other words, the relation of n=rm is established. The r can be defined as the radix of the transformation. The smaller DFTs are integrated through a butterfly structure that is a DFT of size r.

Figure 13B:
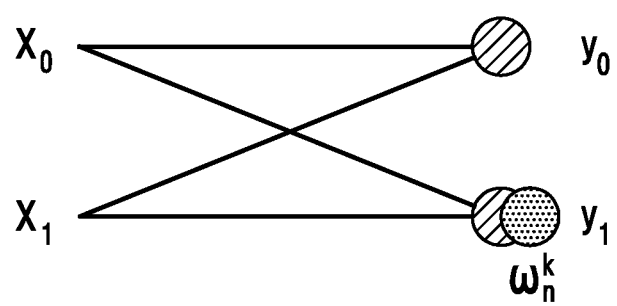

In an embodiment according to the present disclosure, an FFT can be performed using the radix-2 Cooley-Tukey algorithm of odd number 2. In the Cooley-Tuckey algorithm of the radix-2, the butterfly structure shows a DFT of size 2 which has inputs of two values ($x_0$, $x_1$) and has outputs of two values ($y_0$, $y_1$), as shown in FIG. 13B. The complexity in the Decimation-In-Time (DIT) FFT algorithm depends on O(n log n), and ($x_0$, $x_1$) and ($y_0$, $y_1$) satisfy the following equation.

$$y_0 = x_0 + x_1 \omega_n^k$$

$$y_1 = x_0 + x_1 \omega_n^k \qquad \text{[Equation 3]}$$

In equation (3), $\omega_n^k$ is defined by equation (4) as follows.

$$\omega_n^k = e^{-\frac{2\pi i k}{n}}. \qquad \text{[Equation 4]}$$

Here, n denotes the number of input values and can be represented by a power of two. K is an integer that depends on the FFT transform being computed. O is a function that denotes the complexity according to big O notation. For example, the O(n log n) indicates that the complexity of FFT algorithm is proportional to n log n when the number n of input values is sufficiently large.

In the FBMC system, it is possible to detect the frequency axis signal by repeatedly using a single FFT. However, in the present disclosure, since the transmitting ends that transmit signals to the receiving end are orthogonally allocated to different frequency bands at the same time point, when a single FFT is not implemented, unused butterfly structures can be generated. In other words, as compared with the case of applying a separate receiving end that simultaneously performs the filtering and FFT on each of the signals transmitted by the plurality of transmitting ends in the FBMC system, when the signals transmitted by the orthogonally allocated plurality of transmitting ends are received by a single receiving end and the signals are filtered on each transmitting end, and then the filtered signals are summed up to perform a single FFT on the same, unused the butterfly structures can be generated. For example, the unnecessary signal shown in FIG. 13A shows an example of the unused butterfly structure. The present disclosure provides an embodiment of a single FFT implementation that can minimize or reduce the implementation complexity by eliminating the unused butterfly structure.

Figure 14:
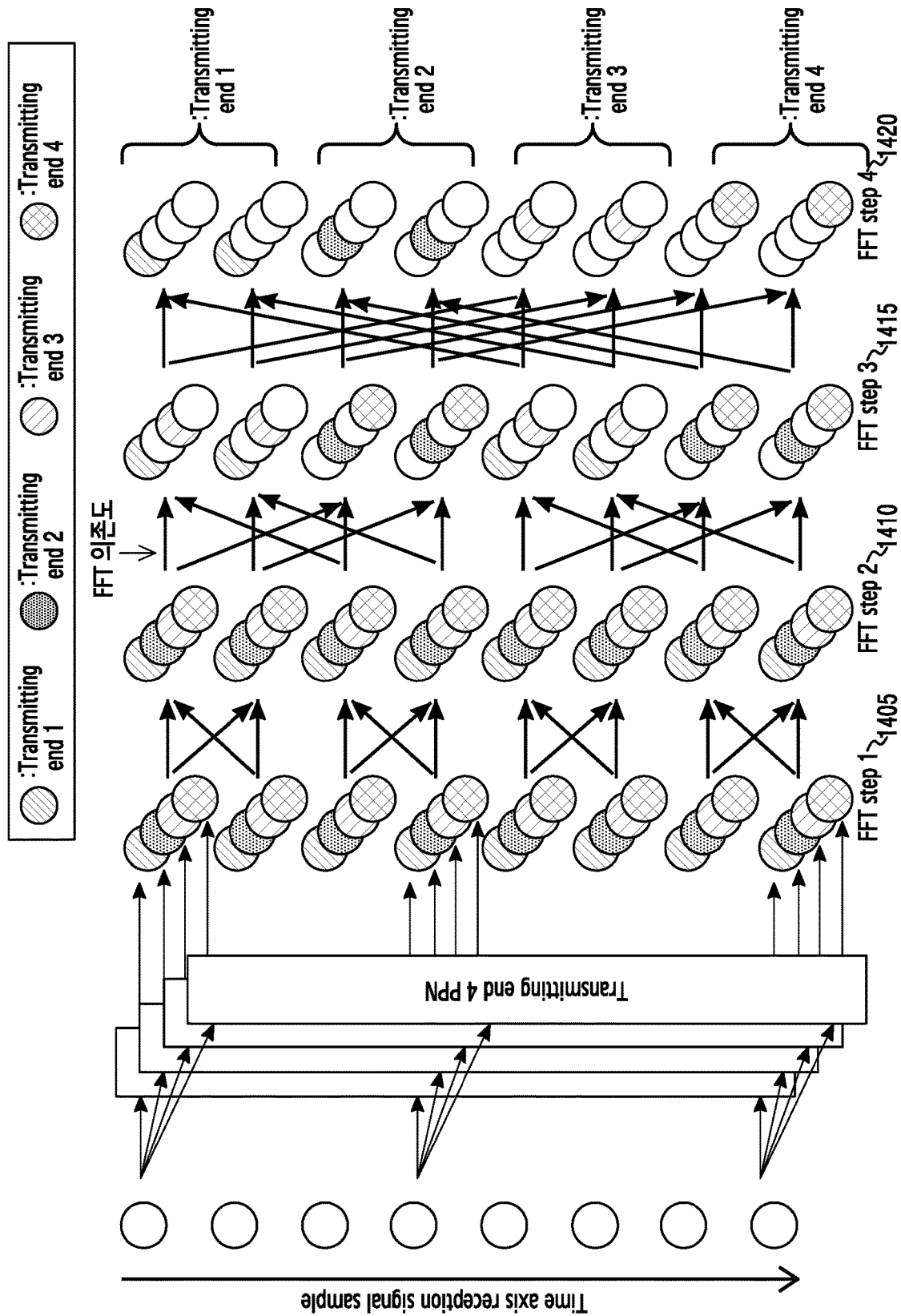
FIG. 14 illustrates a detailed implementation diagram of a single FFT block according to an embodiment of the present disclosure.

FIG. 14 shows a detailed implementation diagram of a single FFT block according to an embodiment of the present disclosure. In an embodiment of the present disclosure, the transmitting ends transmit the FBMC signal to the receiving end according to a predetermined frame. In other words, the transmitting ends can receive the Reference Signal (RS) of the receiving end and the receiving end side can simultaneously receive the signals transmitted from the transmitting ends, based on the information determined from the reference signal. Here, the transmitting ends allocated at the same time point receive resources orthogonal to each other in the time and frequency domains. The receiving end samples the received signal on the time axis, and filters the sampled signal using a filter for each transmitting end. The filtered signals are merged and an FFT operation is performed on the same through a single FFT block. Since the transmitting ends receive resources orthogonal to each other in the time and frequency domains, there is a possibility that, when a single FFT operation is performed on the filtered signal, one transmitting end may not affect the FFT detailed blocks used by other transmitting ends. FIG. 14 shows an example of implementing an FFT in a situation where four transmitting ends use two subcarriers, respectively. That is, eight subcarriers are used in the FFT. In FIG. 14, circles indicated in each FFT step can be seen as an input value or an output value in the butterfly diagram of FIG. 13. Since the complexity per single butterfly structure is fixed, the circles can be usefully used for complexity calculations. In other words, it can be seen that the complexity is reduced by the number of circles marked as unused in FIG. 14. All of the circles shown in FFT step 1 1405 and FFT step 2 1410 are marked in order to indicate that circles correspond to the transmitting ends 1 to 4, respectively. However, the circles shown in FFT step 3 1415 and FFT step 4 1420 are marked in order to indicate that they correspond to the transmitting ends 1 to 4, but some of the circles are not marked. The unmarked circles represent an unused butterfly structure. Thus, when the unused butterfly structure, i.e., unused FFT detailed blocks are removed in the FFT implementation, the reception complexity can be reduced. Since the complexity per fixed butterfly structure is fixed, if the unused FFT detailed blocks are removed from the FFT implementation, the FFT complexity can be reduced by as much as the amount of the unmarked circles shown in FIG. 14.

Figure 15:
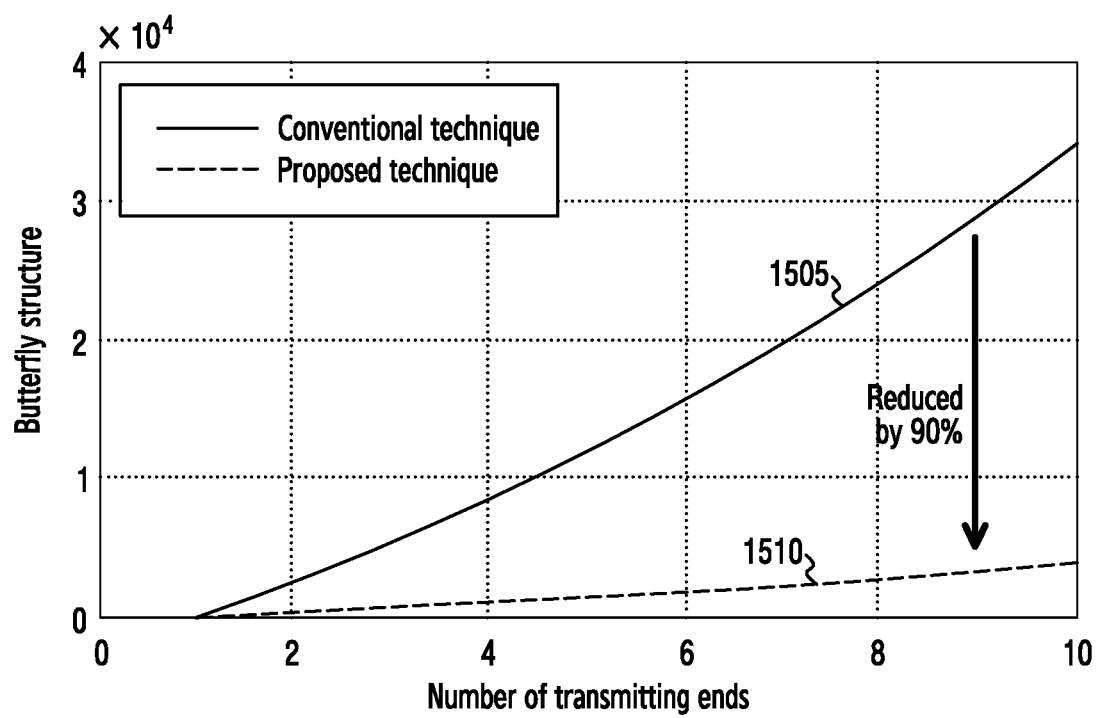
FIG. 15 is a graph showing the effect of the complexity reduction of the FFT structure according to an embodiment of the present disclosure.

FIG. 15 is a graph showing the effect of reducing the complexity of the FFT structure according to an embodiment of the present disclosure. In the graph, the horizontal axis represents the number of transmitting ends for transmitting signals in the FBMC system, and the vertical axis represents the number of butterfly structures in the FFT block. Since the complexity per single butterfly structure is fixed, the number of butterfly structures can represent the complexity. That is, in the graph, the horizontal axis represents the complexity when the FFT is performed. Reference numeral 1505 is a graph showing the relationship between the number of transmitting ends and the complexity when the conventional FFT scheme is used. In other words, reference numeral 1505 is a graph showing the complexity when a separate receiving end that performs filtering together with the FFT on respective signals transmitted by a plurality of transmitting ends in the FBMC system is applied. Reference numeral 1510 is a graph showing the relationship between the number of transmitting ends and the complexity when the FFT is performed according to an embodiment of the present disclosure. In an embodiment of the present disclosure, since signals transmitted from orthogonally allocated transmitting ends are received by a single receiving end, the signals are filtered for each transmitting end, and the filtered signals are summed up to perform a single FFT, so that unused butterfly structures can be generated. In the FFT scheme according to an embodiment of the present disclosure, since the detailed blocks of the unused butterfly structure are removed to perform the FFT operation, the complexity can be reduced.

When it is assumed that the total number of subcarriers is N and the number of subcarriers per user is M, the complexity according to the conventional FFT scheme, that is, the number of butterfly structures can be denoted by the number of $$\frac{N^2}{2M}\log_2 N.$$

In addition, the complexity by the FFT scheme according to an embodiment of the resent disclosure, that is, the number of butterfly structures, can be denoted by the number of $$M\left(\frac{N}{2^{M-1}}-1\right)+\frac{N}{2}(M-1).$$

Reference numerals 1505 and 1510 shown in FIG. 15 show the relationship of complexity between the case of using the conventional FFT scheme and the case of using the FFT scheme according to an embodiment of the present disclosure. Referring to FIG. 15, when the FFT according to an embodiment of the present disclosure is performed, the number of butterfly structures is reduced by about 90%, that is, the complexity is reduced by about 90%, as compared with the conventional FFT scheme. However, the complexity reduction rate can have a value other than 90% according to the total number of subcarriers and the number of subcarriers per user.

Figure 16B:
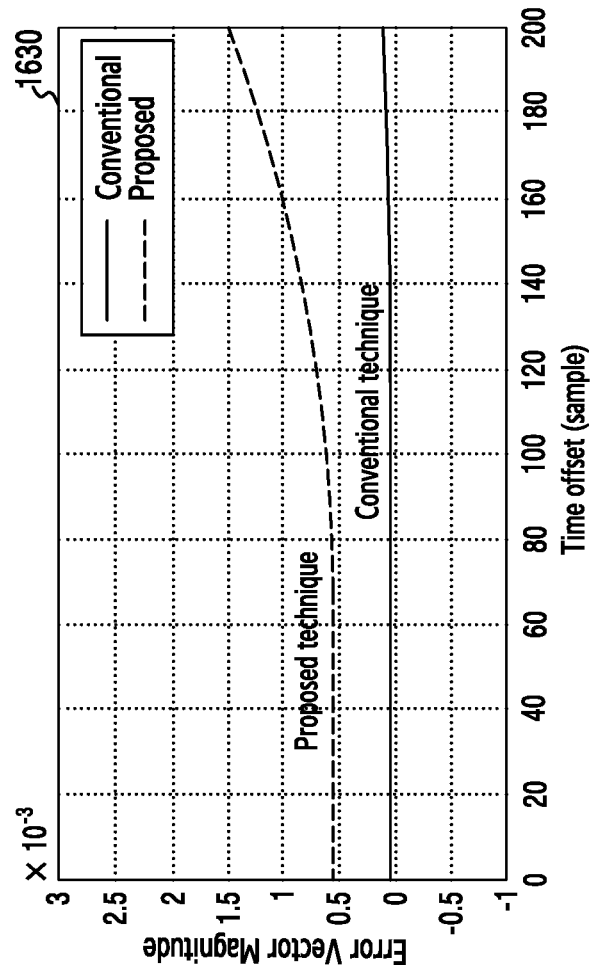
FIGS. 16A and 16B illustrates the effect of complexity and Error Vector Magnitude (EVM) when filtering and a single FFT are performed on each transmitting end according to an embodiment of the present disclosure.
Figure 16A:
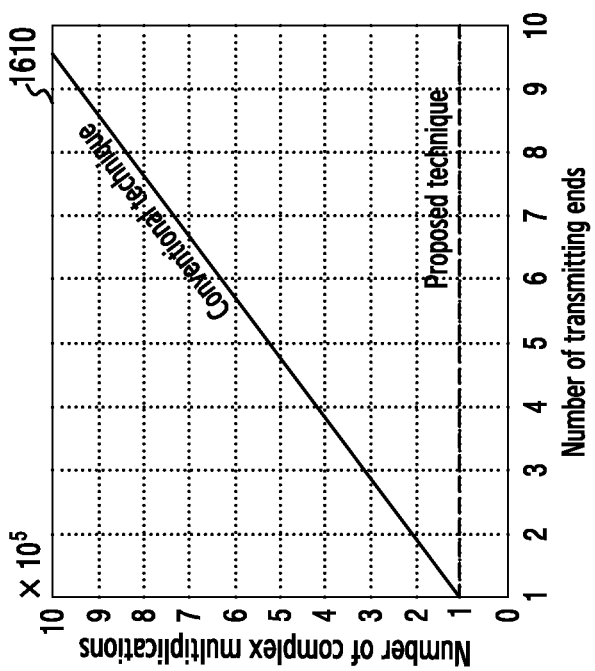

FIGS. 16A and 16b are a graph showing the effect of filtering and single FFT on each transmitting end according to an embodiment of the present disclosure. Graphs 1610 and 1630 illustrate the relationship between the conventional technique and the proposed technique. The conventional technique refers to a case where a separate receiving end for performing filtering together with the FFT is applied to each of the signals transmitted from a plurality of transmitting ends. The proposed technique refers to a case where a single receiving end performs filtering on each transmitting end by separating a block that performs an FFT and a Poly Phase Network (PPN) filter, and sums up the filtered signals to perform a single FFT on the same. The graph 1610 shows the number of transmitting ends and the number of complex multiplications in the FFT for the case where the conventional technique and proposed technique are used. The number of complex multiplications can represent complexity. The graph 1610 shows that the number of complex multiplications, in other words, the complexity increases in proportion to the increasing number of transmitting ends when the conventional technique is used. On the other hand, a graph 1610 shows that the number of complex multiplications is constant without increasing even if the number of transmitting ends is increased when the proposed technique is used. In other words, the proposed technique can have a constant complexity regardless of the number of transmitting ends. Since the conventional technique uses a separate receiving end for each signal transmitted by the transmitting ends, that is, the filtering and FFT are performed on each of the signals transmitted by the transmitting ends, the conventional technique can have high complexity. On the other hand, in the case of the proposed method, since a block on which the FFT is performed and a Poly Phase Network (PPN) filter are separated by a single receiving end and the filtering is separately performed on each transmitting end, but the FFT operation is performed on the summed filtered signals through a single FFT block structure, the complexity can be lowered. The relationship between the conventional technique and the proposed technique shown in the graph 1610 is theoretically illustrated, and the actual complexity can be different. For example, when the proposed technique is used, the complexity may not be constant in practice when the number of transmitting ends increases. However, it can be inferred that the complexity when the proposed technique is used is lower than the case where the conventional method is used, theoretically or actually.

The graph 1630 shows the relationship between the time offset and the Error Vector Magnitude (EVM) when the conventional technique and the proposed technique are used. The EVM can have a larger value as the difference is larger between the window start point that is the reference time at which the reception sample is received when the receiving end receives as many reception samples as the filter length, and the start point of the signal transmitted by the transmitting end. In the graph 1630, since the conventional technique performs the filtering and FFT using an independent receiving end for each of the signals transmitted from the plurality of transmitting ends, the start point of the signal filtered in each receiving end and the window start point are almost coincident with each other. That is, the EVM can hardly occur, which corresponds to the line denoted by the conventional technique in graph 1630. Since the proposed technique processes the signals, transmitted from a plurality of transmitting ends, by one receiving end, a time synchronization error can occur between the signals transmitted from the plurality of transmitting ends. Since Guard Interval (GI) such as Cyclic Prefix (CP) does not exist in the FBMC-based system, unlike the OFDM system, when there is a difference in time synchronization errors between signals transmitted from the transmitting ends, the orthogonality between a transmitting end filter and a reception end filter is disrupted, so that the Inter-Channel Interference (ICI) and Inter-User Interference (IUI) can occur. The Inter-Channel Interference (ICI) and Inter-User Interference (IUI) can include an EVM. Referring to the graph 1630, it is illustrated that the EVM of the proposed technique is larger than the EVM of the conventional technique. This is due to the fact that, even if one receiving end performs filtering on each transmitting end, the influence of the ICI and IUI due to the time synchronization error between transmitting ends cannot be completely removed, in comparison to the case of performing filtering, by a separate independent receiving end, on the signals transmitted from multiple transmitting ends. However, for example, the graph 1630 shows that the EVM is less than 0.1% when the time offset is 120 samples. In other words, even if the EVM in the proposed technique is larger than the EVM in the conventional technique, the difference is small. That is, according to the graphs 1610 and 1630, when a PPN (Poly Phase Network) filter and a block for performing an FFT are separated, by one receiving end, to perform filtering on each transmitting end and the filtered signals are summed so as to perform a single FFT on the same according to an embodiment of the present disclosure, it can be seen that the performance degradation in the EVM is small but the complexity is greatly reduced, so that the performance of the receiving end is improved.

Figure 17A:
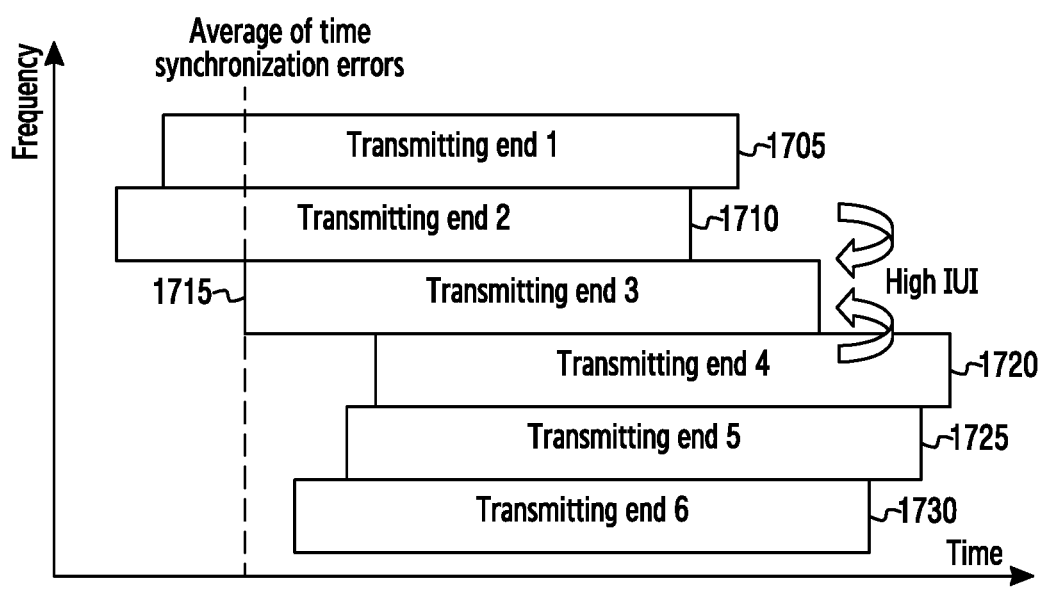
FIG. 17A illustrates an example of a case where a time synchronization error between transmitting ends scheduled in adjacent frequency bands is large according to an embodiment of the present disclosure.

FIG. 17A shows an example of a case where the time synchronization error between transmitting ends scheduled in adjacent frequency bands is large according to an embodiment of the present disclosure. In the present example, multiple transmitting ends transmit signals to one receiving end. In this case, the transmitting ends transmit the FBMC signal to the receiving end according to a predetermined frame. In other words, the transmitting ends receive the Reference Signal (RS) of the receiving end, and transmit the signals in time so that as many transmitting ends as possible can simultaneously receive signals from one receiving end. The receiving end receives signals transmitted from the transmitting ends and simultaneously processes the signals of the transmitting ends in order to detect a signal. However, the receiving end can have the time synchronization error between the signals transmitted from the transmitting ends. For example, due to the geographical location of the transmitting ends, the time synchronization error can occur between the transmitting ends due to the propagation time at which the signals transmitted from the transmitting ends arrive at the receiving end depending on the distance between the transmitting ends and the receiving end. Referring to FIG. 17A, the start point of the signal of the transmitting end 3 1715 coincides with an average of the time synchronization errors of the transmitting ends. In other words, the start point of the signal of the transmitting end 3 1715 coincides with the window start point. The window start point is a reference time point at which the reception sample is received when the receiving end receives as many reception samples as the filter length, and can be a time point at which the time synchronization error is zero. Since Guard Interval (GI) such as Cyclic Prefix (CP) does not exist in the FBMC-based system, unlike the OFDM system, when the time synchronization error exists between signals transmitted from the transmitting ends, the orthogonality between the transmitting end filter and the receiving end filter is disrupted, so that the Inter-Channel Interference (ICI) and Inter-User Interference (IUI) can occur. In other words, when the time synchronization error exists, it can have an interference influence on a transmitting end allocated to a frequency band different from the frequency band to which an arbitrary transmitting end is allocated. The interference influence can be smaller as the transmitting end is further from the frequency band to which an arbitrary transmitting end is allocated. In other words, the larger the difference in the time synchronization errors between the transmitting ends allocated to the adjacent frequency bands, the more ICI and IUI can occur. Therefore, it can be required to reallocate the frequency resources of the transmitting ends so that the difference in time synchronization error between the transmitting ends allocated to the adjacent frequency band is minimized or reduced.

Figure 17B:
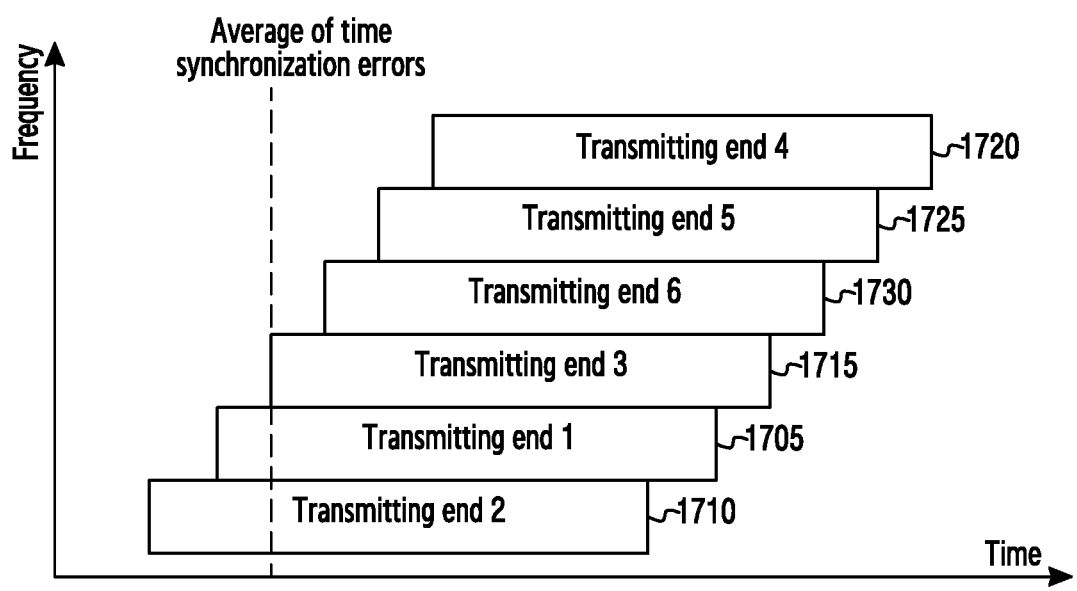
FIG. 17B illustrates an example of a method of scheduling transmitting ends such that the time synchronization error is small according to an embodiment of the present disclosure.
Figure 17C:
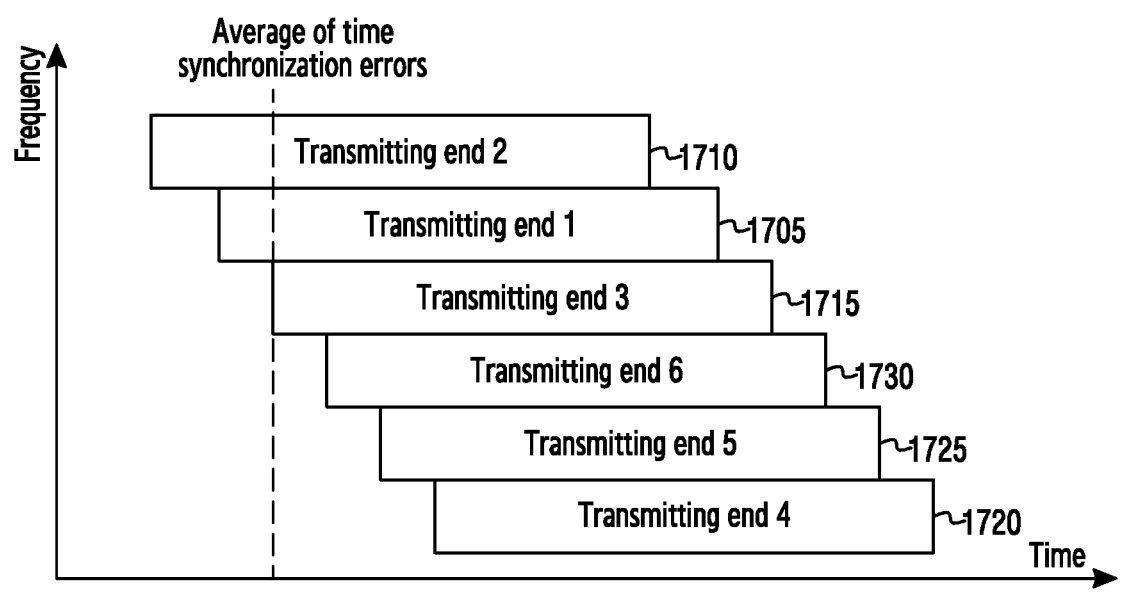
FIG. 17C illustrates another example of a method for scheduling transmitting ends such that the time synchronization error is small according to an embodiment of the present disclosure.

The present disclosure provides examples of a method of reallocating frequency resources of the transmitting ends in consideration of a time synchronization error between transmitting ends allocated to adjacent frequency bands. FIG. 17A, since the time synchronization error does not exist in the transmitting end 3 1715 but the difference in time synchronization errors is large between the transmitting end 2 1710 and the transmitting end 4 1720, allocated to the adjacent frequency bands, the more ICI and IUI can occur. Therefore, it can be required to reallocate the frequency resources of the transmitting ends so that the difference in time synchronization errors between the transmitting ends allocated to the adjacent frequency bands is minimized or reduced. FIG. 17B shows an example of a method of scheduling transmitting ends such that the time synchronization error between transmitting ends allocated to adjacent frequency bands is minimized or reduced according to the present disclosure. FIG. 17B illustrates a method of allocating, by the receiving end, frequency band resources in the order of the time synchronization errors of the respective transmitting ends based on the channel estimated by each transmitting end and the time synchronization error for each transmitting end, so as to minimize or reduce the difference between the time synchronization errors. In other words, the receiving end reallocates the frequency resources of the transmitting ends such that the receiving end successively allocates the transmitting end having a small time synchronization error to the low frequency band, and allocates the transmitting end having the large time synchronization error to the high frequency band, so that the difference in the time synchronization errors between the transmitting ends allocated to the adjacent frequency bands is minimized or reduced. FIG. 17B illustrates that a transmitting end 2 1710, a transmitting end 1 1705, a transmitting end 3 1715, a transmitting end 6 1730, a transmitting end 5 1725, and a transmitting end 4 1720 shown in FIG. 17A are successively allocated in an ascending order of the lower frequency band according to the frequency resource reallocation. FIG. 17C shows another example of a method of scheduling transmitting ends so that the time synchronization error between transmitting ends allocated to adjacent frequency bands is minimized or reduced according to the present disclosure. In FIG. 17C, the receiving end reallocates the frequency resources of the transmitting ends such that the receiving end successively allocates the transmitting end having a large time synchronization error to the low frequency band, and allocates the transmitting end having a small time synchronization error to the high frequency band sequentially, so that the difference in the time synchronization errors between the transmitting ends allocated to the adjacent frequency bands is minimized or reduced. FIG. 17C illustrates that the transmitting end 2 1710, the transmitting end 1 1705, the transmitting end 3 1715, the transmitting end 6 1730, the transmitting end 5 1725, and the transmitting end 4 1720 shown in FIG. 17A are successively allocated in an ascending order of the lower frequency band according to the frequency resource reallocation.

FIGS. 17B and 17C illustrate a method of reallocating frequency resources so that the difference in time synchronization errors between the transmitting ends allocated to the adjacent frequency bands is minimized or reduced, and successively reallocating the frequency resources in the frequency bands according to the magnitude of the time synchronization error of each transmitting end. However, the method of reallocating frequency resources is not limited to the example shown in FIGS. 17B and 17C, and can include another method of reallocating frequency resources of transmitting ends so that ICI and IUI between transmitting ends become small.

Figure 18:
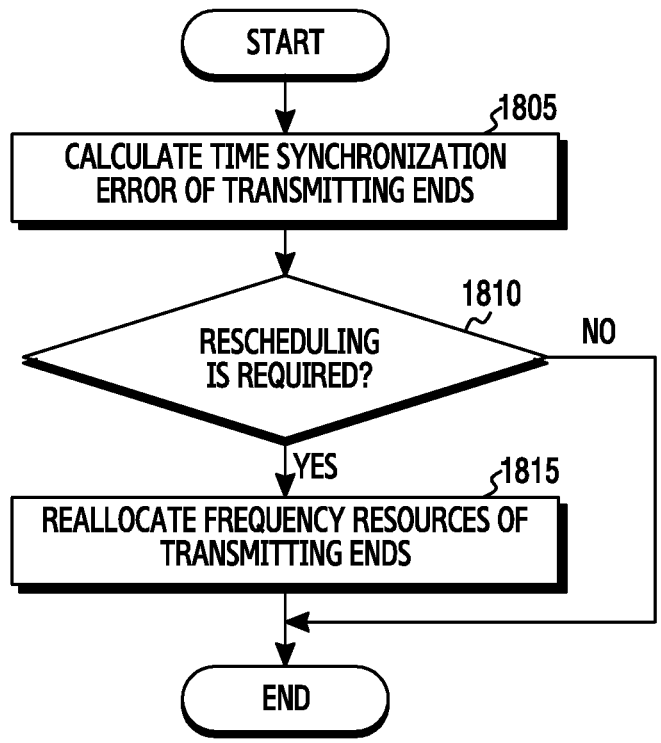
FIG. 18 is a flowchart illustrating an operation of a receiving end for rescheduling transmitting ends to a frequency band according to an embodiment of the present disclosure.

FIG. 18 is a flowchart illustrating an operation of a receiving end that reschedules transmitting ends to frequency bands according to an embodiment of the present disclosure. In step 1805, the receiving end calculates a time synchronization error for each transmitting end from the signals transmitted from the transmitting end. The time synchronization error can be obtained by using a general correlation-based synchronization estimation method used in conventional OFDM systems such as LTE/LTE-A or the relationship between the error vector magnitude (EVM) and the time synchronization error. In step 1805, the time synchronization error is calculated, then the process proceeds to step 1810, and the receiving end determines whether it is required to perform frequency resource rescheduling, that is, to reallocate frequency band resources for the transmitting ends. The frequency resource rescheduling can be required in the case where the difference in time synchronization errors between adjacent transmitting ends in the frequency band is large so that the ICI and IUI being equal or greater than an acceptance level occur. In step 1810, when it is determined that the ICI and IUI being equal or greater than the acceptance level do not occur between the transmitting ends, the algorithm is terminated. In step 1810, when it is determined that the ICI and the IUI being equal or greater than the acceptance level between the transmitting ends occur, the process proceeds to step 1815 where the receiving station reallocates the frequency resources of the transmitting ends. The frequency resource reallocation can include successively reallocating frequency bands from a lower frequency band to a higher frequency band or successively reallocating the frequency bands from a higher frequency band to a lower frequency band in order of magnitude of the time synchronization error of each transmitting end. However, the method of reallocating frequency resources is not limited thereto, and the present disclosure can include another method of reallocating frequency resources for transmitting ends so that ICI and IUI between adjacent transmitting ends are minimized or reduced.

Figure 19:
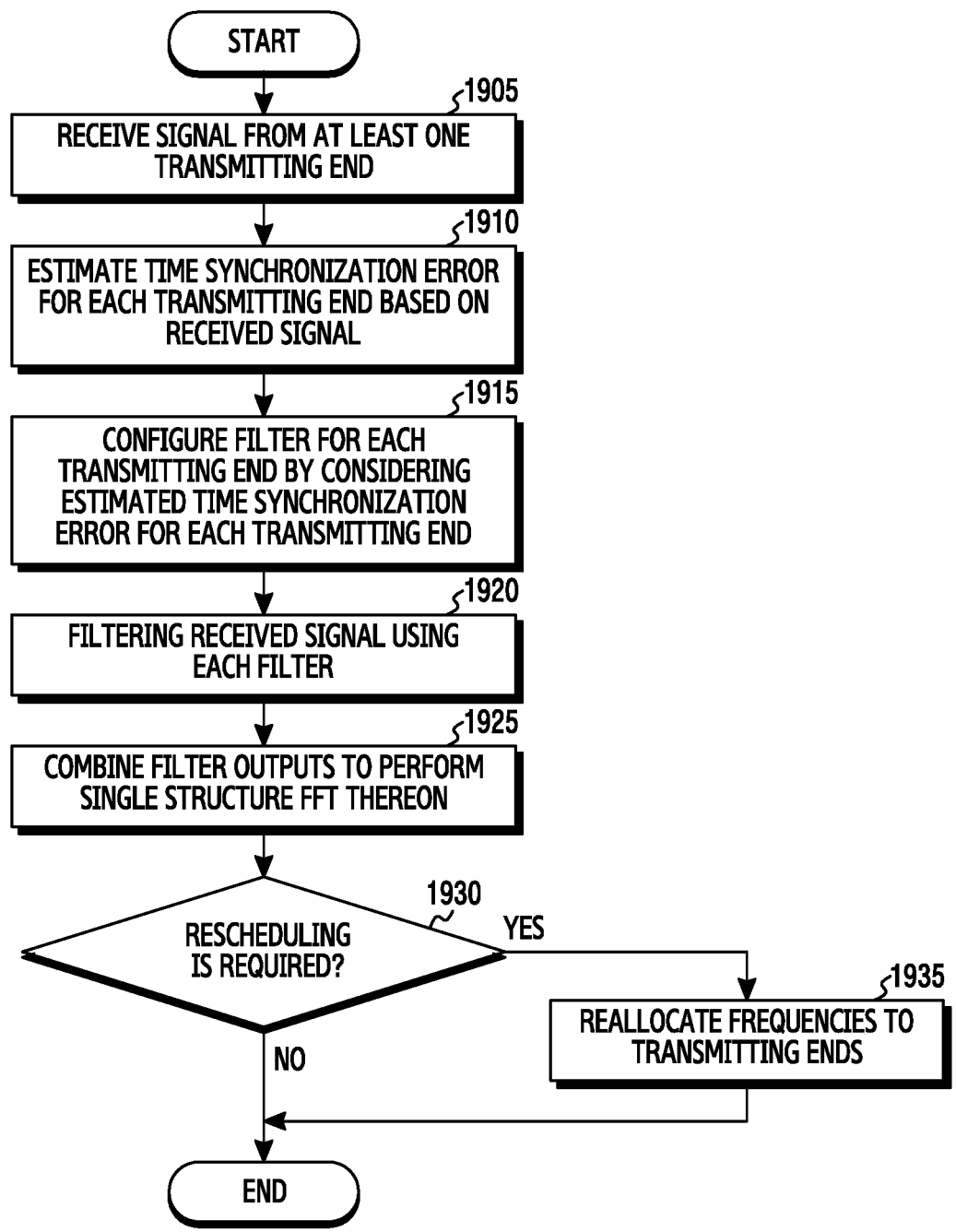
FIG. 19 is a flowchart illustrating an overall operation of a receiving end for performing filtering on each transmitting end according to an embodiment of the present disclosure.

FIG. 19 is a flowchart illustrating an overall operation of a receiving end which performs filtering on each transmitting end according to an embodiment of the present disclosure. In step 1905, the receiving end receives signals from at least one transmitting end. The signals are transmitted to the receiving end according to a predetermined frame. For example, the transmitting ends can receive a Reference Signal (RS) of a receiving end, and the receiving end side can simultaneously receive the signals transmitted from the transmitting ends based on the information determined from the reference signal. Here, the signals of the transmitting ends are allocated resources orthogonal to each other in the time and frequency domains. In addition, the receiving end receives signals transmitted from the transmitting ends and simultaneously processes the signals of the transmitting ends in order to detect a signal. After step 1905, in step 1910, the receiving end estimates the time synchronization error for each transmitting end based on the received signal. The time synchronization error can be obtained by using a general correlation-based synchronization estimation method used in the conventional OFDM systems such as LTE/LTE-A or the relationship between the EVM and the time synchronization error. The estimated time synchronization error in step 1910 can be used to configure a filter for each transmitting end or to reallocate the frequency resources of the transmitting ends. After step 1910, the process proceeds to step 1915, where a filter for each transmitting end is configured in consideration of the estimated time synchronization errors for the transmitting ends. The filter for each transmitting end can be configured by delay shifting or advance shifting the original filter that is a filter matched with the signal received without a time synchronization error, with respect to the time axis, by as much as a time synchronization error for each transmitting end. However, a method for configuring a filter for each transmitting end can be different from the method for shifting the original filter with respect to the time axis. The receiving end configured as a filter for each transmitting end proceeds to step 1920 and filters the received signal using the filter configured for each transmitting end. The filter for each transmitting end can be used in the same meaning as the reconstruction filter. In step 1920, the receiving end can copy the summed signal received from the transmitting ends, and can filter the same in parallel to each of the reconstruction filters configured in step 1915. Each of the parallel-filtered signals is merged and a single structure FFT is performed on the same in step 1925. In other words, in the present disclosure, one receiving end can separate a block that performs an FFT and a Poly Phase Network (PPN) filter so as to perform filtering on each transmitting end, and sums up the filtered signals to perform a single FFT. The single FFT structure performed in step 1925 can use a method of reducing the complexity by removing the butterfly structure that is not used in the FFT process. In other words, in the present disclosure, since each transmitting end is allocated resources orthogonal to each other in the time and frequency domains, when a single FFT operation is performed on the filtered signal, there is a possibility in that one transmitting end may not affect an FFT detailed block that is used by another transmitting end. Therefore, the reception complexity can be reduced by removing the unaffected FFT sub-blocks from the FFT operation. The receiving end that has performed the FFT operation in step 1920 determines whether rescheduling is required in step 1930. The re-scheduling includes reallocating frequency resources for each transmitting end so that the IUI and ICI in each transmitting end are minimized or reduced in the frequency band. The frequency resource rescheduling can be required in the case where the difference in time synchronization error between adjacent transmitting ends in the frequency band is large so that the ICI and IUI being equal or greater than the acceptance level can occur. When it is determined that the rescheduling is required in step 1930, the receiving end reallocates frequency resources of the transmitting ends in step 1935. The frequency resource reallocation can include successively reallocating frequency bands from a lower frequency band to a higher frequency band or successively reallocating the frequency bands from a higher frequency band to a lower frequency band in order of magnitude of time synchronization error of each transmitting end. However, the method of reallocating frequency resources is not limited thereto, and the present disclosure can include another method of reallocating frequency resources for transmitting ends so that the ICI and IUI between adjacent transmitting ends are minimized or reduced. In step 1930, when it is determined by the receiving end that the rescheduling is not required, the receiving end terminates the algorithm.

Figure 20:
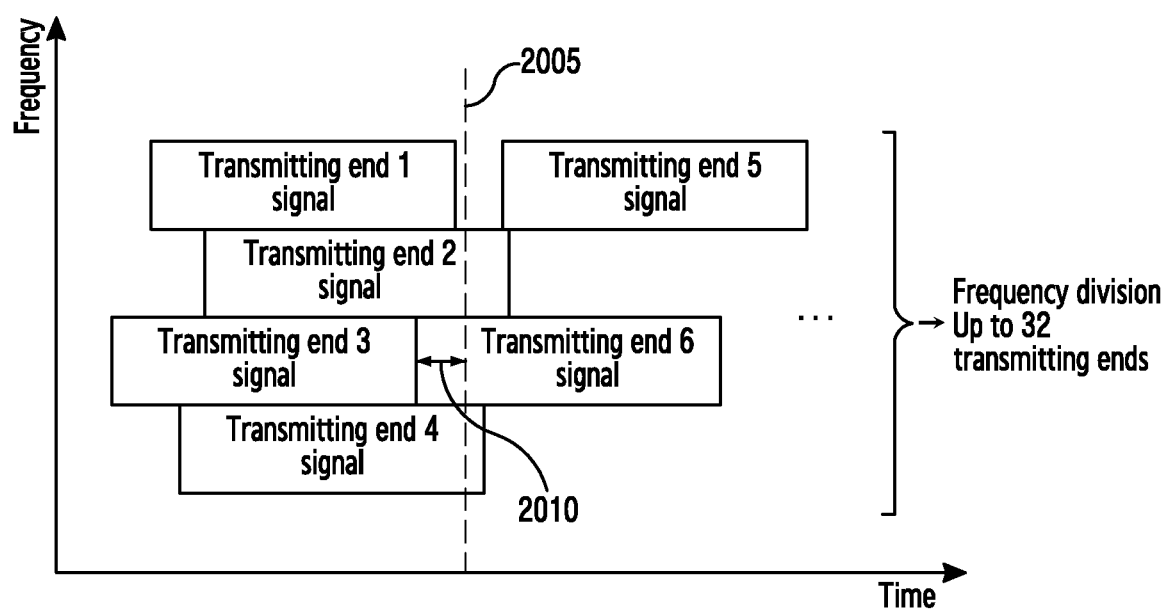
FIGS. 20 to 22 illustrate simulation results indicating effects according to an embodiment of the present disclosure.
Figure 21:
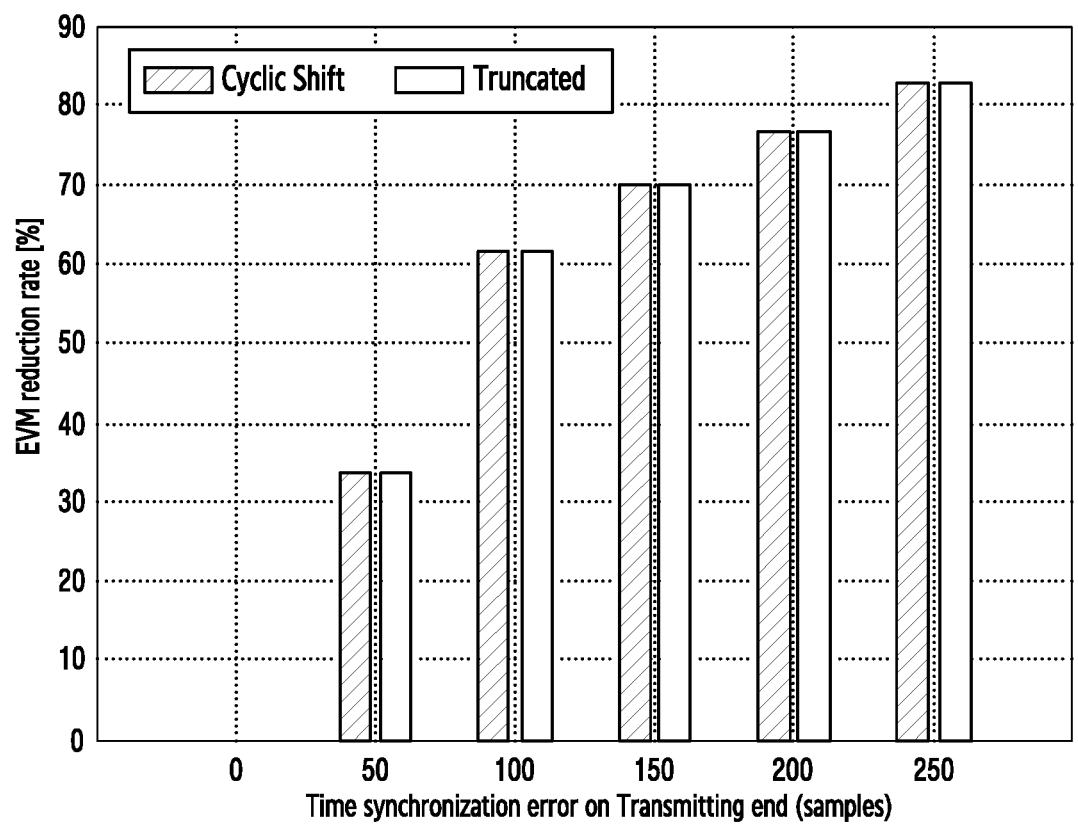
Figure 22:
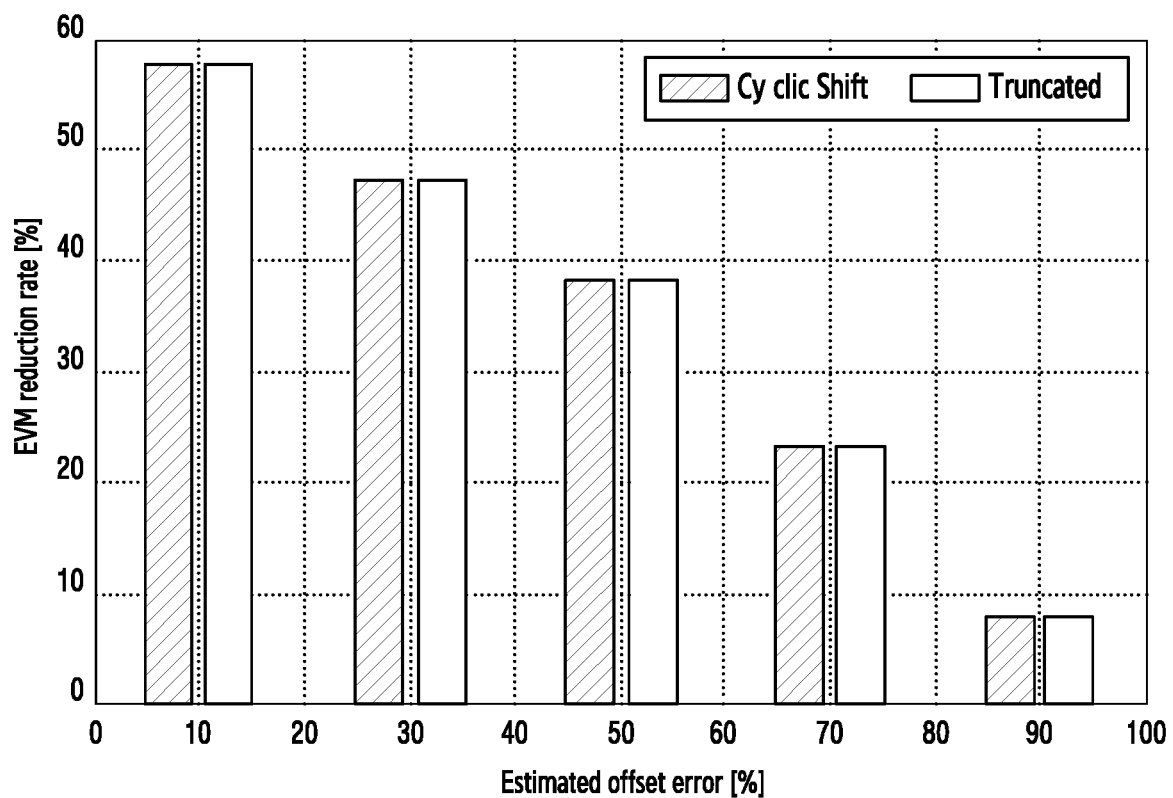

FIGS. 20 to 22 illustrate simulation results showing effects according to an embodiment of the present disclosure. The simulation is performed in an environment where 1024 subcarriers, 32 frequency-division simultaneous transmitting ends, 32 subcarriers per transmitting end, and five times oversampling are provided. The simulation is intended to analyze the degree of enhancement of reception performance according to the time synchronization error when the filtering on each transmitting end is performed using the embodiment proposed in the present disclosure. The reception performance enhancement can be measured using an EVM reduction rate when a filter for each transmitting end is configured by a cyclic shift filter or a truncated shift filter. In addition, the degree of reception performance improvement can be measured using an EVM reduction rate based on the difference between a time synchronization error estimation value and an actual time synchronization error.

FIG. 20 illustrates an example of a simulation environment for receiving, by the receiving end, signals from the transmitting ends 1 to 32 according to an embodiment of the present disclosure. Reference numeral 2005 denotes a start point of the signal detection section set by the receiving end. Reference numeral 2010 denotes a normal distribution of the time synchronization error.

FIG. 21 is a graph illustrating the degree of reception performance improvement of a receiving end using an EVM reduction rate when a filter for each transmitting end is configured by a cyclic shift filter or a truncated shift filter. The EVM reduction rate means the EVM reduction ratio of the proposed technique compared to the conventional technique. According to the proposed technique, one receiving end separates the FFT-performing block and the Poly Phase Network (PPN) filter to perform filtering on each transmitting end, and sums up the filtered signal to perform a single FFT on the same. The proposed technique has the same meaning as the proposed technique used in FIGS. 16A and 16B. However, according to the conventional technique, signals transmitted from a plurality of transmitting ends are received by a single receiving end, and the filtering and FFT are performed on the same using a single original filter. The conventional technique is different from the conventional technique of FIGS. 16A and 16B in that the latter is the case of applying a separate receiving end that performs the FFT and filtering together on the signals transmitted by the multiple transmitting ends. Referring to FIG. 21, it can be seen that the EVM reduction rate, that is, the improvement of the reception performance becomes greater as the difference in the time synchronization error between the transmitting ends becomes larger. This is because more ICI and IUI are generated as the difference of the time synchronization errors between the transmitting ends becomes larger, and the ICI and IUI are effectively controlled when the matched filtering is performed through a filter for each transmitting end in consideration of the time synchronization error. For the same time synchronization error, it can be seen that the difference in EVM reduction rate is not large when the transmission-end filter is configured by a cyclic shift filter or a truncated shift filter. This is because the benefit obtained through the matched filtering for each transmitting end is much larger than the disadvantages inherent in the cyclic shift filter and the truncated shift filter. The graph shown in FIG. 21 can be based on the characteristics of the filter itself used in the simulation. In other words, when filters different from those used in the simulations are used, a different graph can be obtained.

FIG. 22 is a graph showing the degree of performance improvement of the receiving end measured using the EVM reduction rate based on the difference between a time synchronization error estimation value and an actual time synchronization error. The EVM reduction rate means a reduction ratio of the EVM of the proposed technique with respect to the conventional technique, and the conventional technique and the proposed technique have the same meaning as those of the conventional technique and the proposed technique in FIG. 21. The receiving end receives signals from the transmitting end and estimates the time synchronization error for each transmitting end. The time synchronization error can be estimated using a correlation-based synchronization estimation method used in the conventional OFDM systems such as LTE/LTE-A or the relationship between the Error Vector Magnitude (EVM) and the time synchronization error. The estimated time synchronization error can be different from the actual time synchronization error. In this case, the degree of enhancement of the reception performance can be affected when filtering on each transmitting end is performed in consideration of the estimated time synchronization error rather than the filtering on each transmitting end being performed in consideration of the actual time synchronization error. The cyclic shift filter and the truncated shift filter are filters configured to shift the original filter with respect to the time axis by the time synchronization error so as to match the original filter with the signal transmitted by each transmitting end. In other words, when the time synchronization error is not correctly estimated, the filters shifted on the time axis may not match the signals transmitted by each transmitting end. Therefore, when the difference between the time synchronization error and the actual offset is large, the improvement of the reception performance can be low. FIG. 22 is a graph illustrating that the larger estimated offset error causes the smaller EVM reduction rate, that is, the degree of improvement in the reception performance is reduced. It can be seen that although the larger estimated offset error causes the lower improvement degree of the reception performance, when the estimated offset error is about 90%, that is, even if the offset estimation is quite inaccurate, a reception performance improvement of about 8% occurs. For the same time synchronization error, it can be seen that the difference in EVM reduction rate is not large when the filter for each transmission end filter is configured by a cyclic shift filter or a truncated shift filter. This is because the benefit obtained through the matched filtering on each transmitting end is much larger than the disadvantages inherent in the cyclic shift filter and the truncated shift filter. The graph shown in FIG. 22 can be based on the characteristics of the filter itself used in the simulation. In other words, when filters different from those used in the simulations are used, a different graph can be obtained.

In the present disclosure, a method is provided, in which a receiving end receives signals transmitted from the transmitting ends, configures a filter for each transmitting end in consideration of the time synchronization error for each of the signals, and then performs matched filtering on the signal for each transmitting end which is received by the receiving end. However, the present disclosure can configure a filter for each transmitting end through a single filter without configuring a filter for each transmitting end in consideration of the time synchronization error, so that the same effect can be obtained as performing the matched filtering on each of the signals transmitted from the transmitting ends. In other words, the receiving end can receive a signal and configure buffers for respective signals transmitted by the transmitting ends, adjust the delay time of the buffers, and perform matched filtering on the received signals using a single filter. In other words, the receiving end extracts samples by using a buffer for each of the signals transmitted from the transmitting ends, by differently setting a sampling interval for each of the signals transmitted from the transmitting ends, merges the individually extracted samples and performs the matched filtering on the same using a single original filter. The buffers can be configured to have different signal sample intervals for filtering according to time synchronization of signals transmitted from the transmitting ends. For example, the buffers can configure such that the start point of a time interval for extracting a sample for filtering coincides with the start point of a signal transmitted by each transmitting end.

As described above, in order to configure a buffer for each of the signals transmitted from the transmitting ends and perform filtering on the same using a single filter, an extended receive window can be required. In other words, when the receiving end receives the signals and extracts reception samples, it can be required to extend the time interval during which the sample is extracted. For example, as in an embodiment of the present disclosure, when the receiving end extracts the receiving sample by the filter length, the start point of the time interval during which a receiving sample is extracted, that is, the window start point can be set as an average of the time synchronization errors of the signals transmitted by the transmitting terminals. However, when the window start point is set as the average of the time synchronization errors, the start point of the signal transmitted by any transmitting end can exist before the window start point, as shown in the graph 505 of FIG. 5. In this case, even when the sampling extraction time interval for filtering is delayed by using the buffer, the start point of the time interval may not coincide with the start time point of a signal transmitted by an arbitrary transmitting end. In other words, when the window start point is set as the average of the time synchronization errors, it may not be possible to perform the matched filtering on the signals transmitted by the respective transmitting ends using the buffer. Therefore, when the receiving end extracts a receiving sample, it may be required to extend the receiving window so that the time interval for extracting the sample includes the start points of the signals transmitted by all the transmitting ends. That is, since each buffer has different signal sample intervals for filtering, it can be required to extend the receive window so that the request signal samples of all buffers are extracted.

Figure 23:
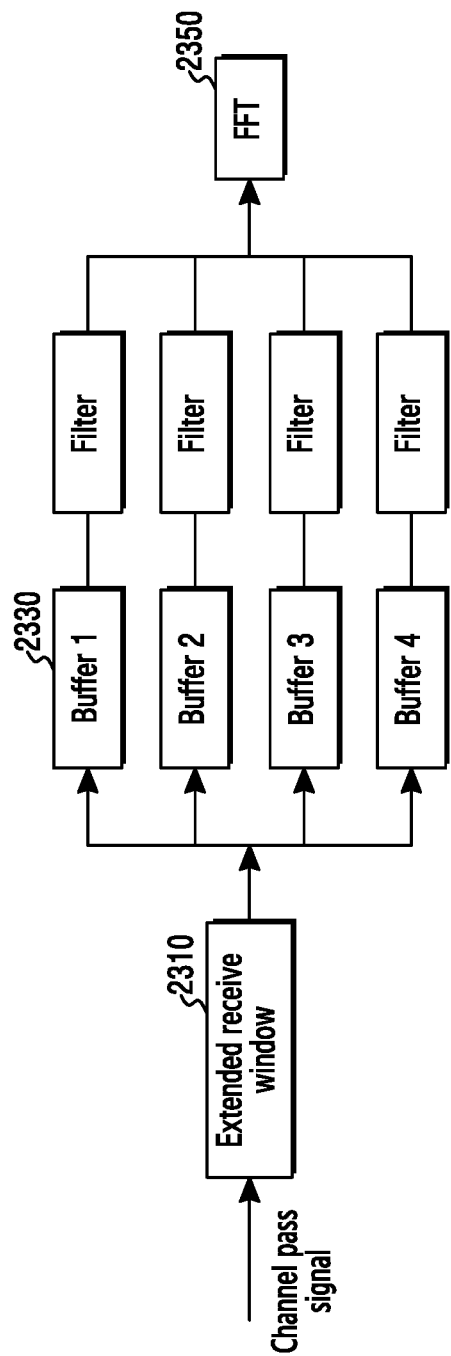
FIG. 23 schematically illustrates a process of performing matched filtering using a buffer for each transmitting end according to an embodiment of the present disclosure.

FIG. 23 schematically illustrates a process of performing matched filtering using a buffer for each transmitting end according to an embodiment of the present disclosure.

The signals transmitted by the transmitting ends pass through a channel and then are received by the receiving end. The receiving end receives the channel pass signal and extracts a sample of the receiving signal using the extended receive window 2310. The extended receive window 2310 is configured such that a time interval for extracting a sample when a reception sample is extracted by the receiving end includes start points of signals of all of the transmitting ends. In other words, since the extended receive window 2310 has a different signal sample interval for each buffer, it can refer to that the receive window is extended such that the request signal samples of all buffers are extracted. The signal samples extracted from the extended receive window 2310 are moved to respective buffers 2330. In the buffers 2330, each buffer can delay the sample extracting time point so that samples for filtering are extracted from the start time of the signal transmitted by each transmitting end. Samples extracted using buffer 2330 can be matched filtered using the same original filter. In other words, since filters corresponding to the buffers 1 to 4 indicated by the buffer 2330 are the same, and the samples extracted using the buffer 2330 are extracted at different sample extracting intervals for filtering such that there is no time synchronization error for each of the signals transmitted from the transmitting terminals, the matched filtering can be performed by applying the same original filter thereto. The filtered signals are merged and then moved to a single FFT block 2350.

In FIG. 23, four buffers are shown in the buffer 2330. However, the number of buffers used in an embodiment of the present disclosure is not limited to four. For example, since the number of buffers is determined by the number of transmitting ends that transmit signals to the receiving end, the number of buffers can be smaller or larger than four.

The methods described in the claims or the specification of the present disclosure can be implemented using hardware and software alone or in combination.

Any such software can be stored in a computer readable storage medium. The computer readable storage medium stores one or more programs (software modules) including instructions, which when executed by at least one processor in a UE, cause the UE to perform a method of the present disclosure.

Any such software can be stored in the form of volatile or non-volatile storage such as Read Only Memory (ROM), or in the form of memory such as Random Access Memory (RAM), memory chips, device, or integrated circuits, or on an optically or magnetically readable medium such as a Compact Disc (CD)-ROM, Digital Versatile Disc (DVD), magnetic disk or magnetic tape or the like.

It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for operating a communication device in a wireless communication system, the method comprising:
    receiving a signal comprising a plurality of signals for a plurality of user devices, the plurality of user devices including a first user device and a second user device, the plurality of signals including a first signal of the first user device and a second signal of the second user device;
    reconfiguring a first filter for the first user device by shifting a reference filter according to a first timing offset of the first signal in a time domain;
    reconfiguring a second filter for the second user device by shifting the reference filter according to a second timing offset the second signal in the time domain;
    applying the reconfigured first filter to the signal and the reconfigured second filter to the signal; and
    applying a Fourier transform to a combined signal to which an output signal of the reconfigured first filter and an output signal of the reconfigured second filter are combined,
    wherein the reference filter is a common filter for the plurality of user devices,
    wherein the reconfigured first filter is a matched filter for the first user device to match the first signal with a reference point of the reference filter,
    wherein the reconfigured second filter is a matched filter for the second user device to match the first signal with a reference point of the reference filter, and
    wherein the first timing offset of the first signal is different from the second timing offset of the second signal based on a distance between the communication device and each of the first user device and the second user device.

2. The method of claim 1, wherein the first timing offset of the first signal is determined by using a correlation between the first signal and a predetermined signal, or an interference between symbols of the first signal and the second signal.

3. The method of claim 1, wherein the reference filter is determined based on an average value of timing offsets each of which corresponds to each of signals received from a plurality of user devices.

4. The method of claim 1, wherein the Fourier transform is performed by omitting a computation that has no effect between user devices during a computation process.

5. The method of claim 1, further comprising:
    determining an interference between the plurality of user devices based on timing offsets of the plurality of user devices; and
    when the interference is equal to or greater than a predetermined value, reallocating frequency band resources to one or more of the plurality of user devices such that the timing offsets of the plurality of user devices are sequentially arranged in the frequency band resources based on the timing offset of the plurality of user devices.

6. The method of claim 5, wherein the reallocating of the frequency band resources to the one or more of the plurality of user devices comprises:
    reallocating frequencies to the one or more of the plurality of user devices such that a timing offset between user devices allocated in adjacent in the frequency band resources is reduced.

7. The method of claim 1, further comprising:
    extracting samples to be filtered from a start point of each of the first signal and the second signal; and
    applying the reference filter to the samples.

8. An apparatus of a communication device in a wireless communication system, the apparatus comprising:
    at least one processor; and
    a transceiver, operatively coupled to the at least one processor, configured to:
        receive a signal comprising a plurality of signals for a plurality of user devices, the plurality of devices including a first user device and a second user device, the plurality of signals including a first signal of the first user device and a second signal of the second user device,
        reconfigure a first filter for the first user device by shifting a reference filter according to a first timing offset of the first signal in a time domain;
        reconfigure a second filter for the second user device by shifting the reference filter according to a second timing offset the second signal in the time domain;
        apply the reconfigured first filter to the signal, and the reconfigured second filter to the signal, and
        apply a Fourier transform to a combined signal to which an output signal of the reconfigured first filter and an output signal of the reconfigured second filter are combined,
    wherein the reference filter is a common filter for the plurality of user devices,
    wherein the reconfigured first filter is a matched filter for the first user device to match the first signal with a reference point of the reference filter,
    wherein the reconfigured second filter is a matched filter for the second user device to match the first signal with a reference point of the reference filter, and
    wherein the first timing offset of the first signal is different from the second timing offset of the second signal based on a distance between the communication device and each of the first user device and the second user device.

9. The apparatus of claim 8, wherein the first timing offset of the first signal is determined by using a correlation between the first signal and a predetermined signal, or an interference between symbols of the first signal and the second signal.

10. The apparatus of claim 8, wherein the reference filter is determined based on an average value of timing offsets each of which corresponds to each of signals received from a plurality of user devices.

11. The apparatus of claim 8, wherein the Fourier transform is performed by omitting a computation that has no effect between user devices during a computation process.

12. The apparatus of claim 8,
    wherein the at least one processor is further configured to:
    determine an interference between the plurality of user devices based on timing offsets of the plurality of user devices; and
    reallocate, when the interference is equal to or greater than a predetermined value, frequency band resources to one or more of the plurality of user devices such that the timing offsets of the plurality of user devices are sequentially arranged in the frequency band resources based on the timing offset of the plurality of user devices.

13. The apparatus of claim 12, wherein the at least one processor is further configured to, to reallocate the frequency band resources to the one or more of the plurality of user devices, reallocate frequencies to the one or more of the plurality of user devices such that a timing offset between user devices allocated in adjacent in the frequency band resources is reduced.

14. The apparatus of claim 8, wherein the at least one processor is further configured to:
   extract samples to be filtered from a start point of each of the first signal and the second signal; and
   apply the reference filter to the samples.

* * * * *